US012563395B2

(12) United States Patent　　　　(10) Patent No.: US 12,563,395 B2
Velev et al.　　　　　　　　　　　(45) Date of Patent: Feb. 24, 2026

(54) ACCESSING A DENIED NETWORK RESOURCE

(71) Applicant: Lenovo (Singapore) PTE. LTD., New Tech Park (SG)

(72) Inventors: Genadi Velev, Darmstadt (DE); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/685,858

(22) Filed: Nov. 15, 2019

(65) Prior Publication Data

US 2020/0162919 A1　　May 21, 2020

Related U.S. Application Data

(60) Provisional application No. 62/768,798, filed on Nov. 16, 2018.

(51) Int. Cl.
H04L 29/06　　　　(2006.01)
H04L 9/40　　　　(2022.01)
(Continued)

(52) U.S. Cl.
CPC ....... H04W 12/084 (2021.01); H04L 63/0892 (2013.01); H04L 63/102 (2013.01);
(Continued)

(58) Field of Classification Search
CPC ............. H04W 12/068; H04W 12/084; H04W 12/082; H04W 12/35; H04W 12/69; H04W 48/18; H04L 63/0892; H04L 63/102
See application file for complete search history.

(56) References Cited

U.S. PATENT DOCUMENTS 10,491,376 B1 * 11/2019 Suthar ................... H04L 63/102
11,528,659 B2 * 12/2022 Tiwari ................... H04W 48/16
(Continued)

FOREIGN PATENT DOCUMENTS

EP　　　　3806556 A1　　4/2021
WO　　2018194315 A1　　10/2018

OTHER PUBLICATIONS

3GPP, "3rd Generation Partnership Project; Technical Specification Group Core Network and Terminals; 5G System; Interworking between 5G Network and external Data Networks; Stage 3 (Release 15)", 3GPP TS 29.561 V15.1.0, Sep. 2018, pp. 1-46.
(Continued)

*Primary Examiner* — Joseph P Hirl
*Assistant Examiner* — Chi D Nguy
(74) *Attorney, Agent, or Firm* — Kunzler Needham & Hilton

(57)　　　　ABSTRACT

Apparatuses, methods, and systems are disclosed for accessing a denied network resource. One apparatus includes a processor and a transceiver that receives a first message indicating that access to a network resource in a mobile communication network is denied due to authorization specific for the network resource. Here, the network resource is identified by at least one of: a network slice identifier and a data network name ("DNN"). The processor monitors for a condition to be met prior to initiating a new request for establishing an access to the denied network resource and initiates signaling towards the network to establish an access to the denied network resource in response to the condition being met.

20 Claims, 10 Drawing Sheets

(51) Int. Cl.

| | |
|---|---|
| *H04W 12/06* | (2021.01) |
| *H04W 12/082* | (2021.01) |
| *H04W 12/084* | (2021.01) |
| *H04W 12/30* | (2021.01) |
| *H04W 48/18* | (2009.01) |
| *H04W 12/69* | (2021.01) |

(52) U.S. Cl.
CPC ....... *H04W 12/068* (2021.01); *H04W 12/082* (2021.01); *H04W 12/35* (2021.01); *H04W 48/18* (2013.01); *H04W 12/69* (2021.01)

(56) References Cited

U.S. PATENT DOCUMENTS

| | | | | |
|---|---|---|---|---|
| 12,219,356 | B2 * | 2/2025 | Faccin .................. | H04W 12/06 |
| 2013/0109377 | A1 * | 5/2013 | Al-Khudairi ......... | H04W 48/16 |
| | | | | 455/432.1 |
| 2018/0206154 | A1 * | 7/2018 | Gao .................. | H04W 36/0066 |
| 2018/0288654 | A1 * | 10/2018 | Shih ...................... | H04W 48/14 |
| 2018/0324577 | A1 * | 11/2018 | Faccin .................. | H04W 76/27 |
| 2018/0367980 | A1 * | 12/2018 | Lee .......................... | H04L 67/51 |
| 2019/0246270 | A1 * | 8/2019 | Ito ...................... | H04W 12/0431 |
| 2019/0274110 | A1 * | 9/2019 | Luft .................... | H04L 63/0884 |
| 2020/0037386 | A1 * | 1/2020 | Park ...................... | H04W 80/10 |
| 2023/0015471 | A1 * | 1/2023 | Hashmi ................. | H04W 48/08 |
| 2025/0113322 | A1 * | 4/2025 | Leon Calvo .......... | H04W 48/18 |

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.3.0, Sep. 2018, pp. 1-330.

3GPP, "3rd Generation Partnership Project; Technical Specification Group Services and System Aspects; Study on Enhancement of Network Slicing (Release 16)", 3GPP TR 23.740 V0.6.0, Oct. 2018, pp. 1-68.

3GPP, "3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.

PCT/IB2019/001248, "Notification of Transmittal of the International Search Report and the Written Opinion of the International Searching Authority, or the Declaration", PCT International Searching Authority, Feb. 25, 2020, pp. 1-49.

Qualcomm, "TS 23.502: handling of PDU sessions at slice unavailablety", S2-173106, SA WG2 Meeting #121, May 15-19, 2017, pp. 1-33.

Samsung, "TS 23.501: Rejected Slices", SA WG2 Meeting #122bis, S2-175774, Aug. 21-25, 2017, pp. 1-4.

* cited by examiner

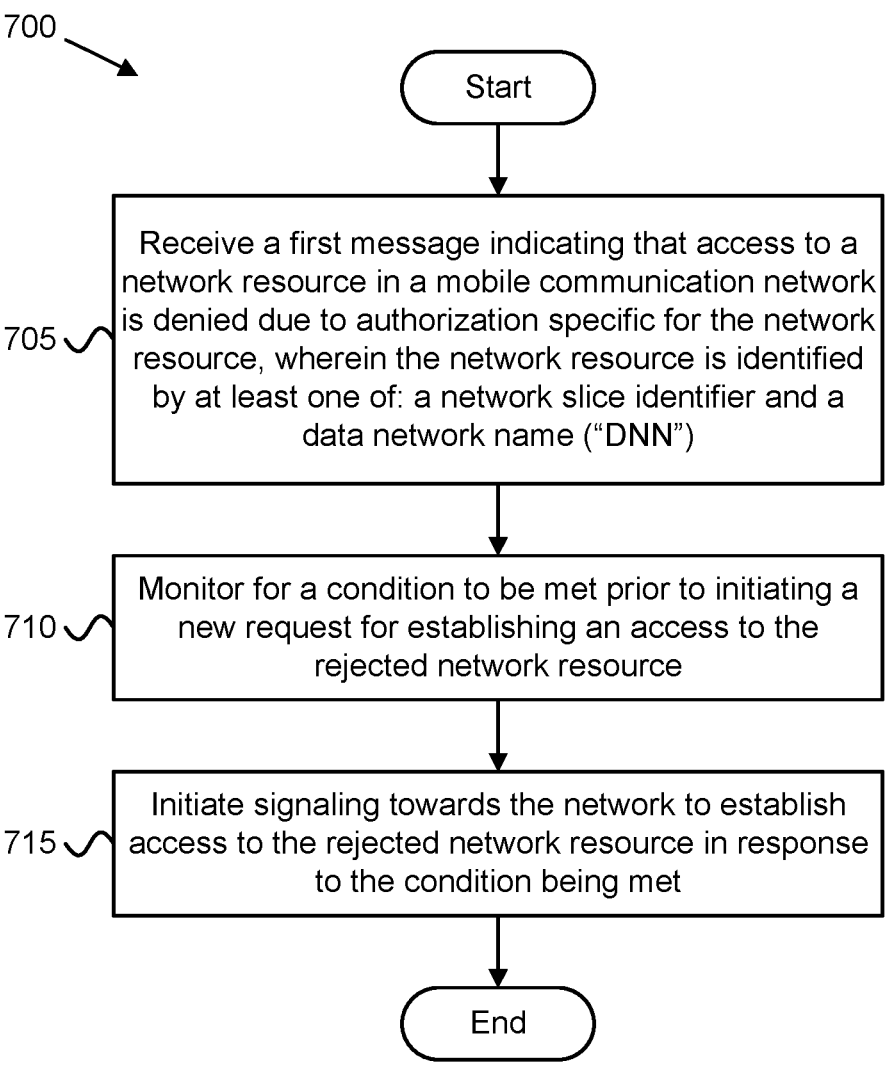

700

Start

705   Receive a first message indicating that access to a network resource in a mobile communication network is denied due to authorization specific for the network resource, wherein the network resource is identified by at least one of: a network slice identifier and a data network name ("DNN")

710   Monitor for a condition to be met prior to initiating a new request for establishing an access to the rejected network resource 715   Initiate signaling towards the network to establish access to the rejected network resource in response to the condition being met End

FIG. 7

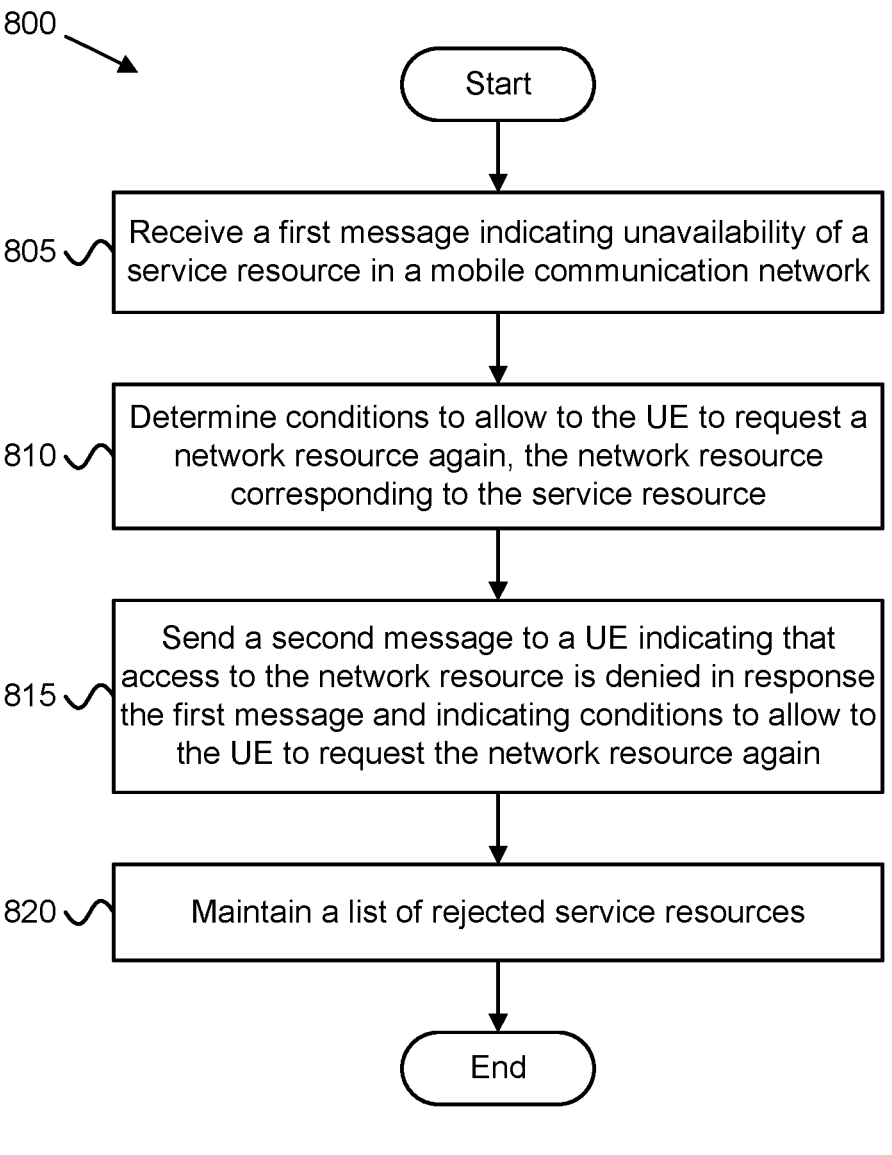

800

Start

805 Receive a first message indicating unavailability of a service resource in a mobile communication network 810 Determine conditions to allow to the UE to request a network resource again, the network resource corresponding to the service resource 815 Send a second message to a UE indicating that access to the network resource is denied in response the first message and indicating conditions to allow to the UE to request the network resource again 820 Maintain a list of rejected service resources End

FIG. 8

ACCESSING A DENIED NETWORK RESOURCE

FIELD

The subject matter disclosed herein relates generally to wireless communications and more particularly relates to accessing a denied network resource, for example handling the case of a S-NSSAI being rejected due to failed slice authentication or revoked authentication/authorization.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Access Stratum ("AS"), Base Station ("BS"), Connection Mode ("CM", this is a NAS state in 5GS), Core Network ("CN"), Control Plane ("CP"), Data Radio Bearer ("DRB"), Downlink Control Information ("DCI"), Downlink ("DL"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), Evolved UMTS Terrestrial Radio Access Network ("E-UTRAN"), General Packet Radio Service ("GPRS"), Generic Public Service Identifier ("GPSI"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Internet-of-Things ("IoT"), International Mobile Subscriber Identity ("IMSI"), Long Term Evolution ("LTE"), Multiple Access ("MA"), Mobility Management ("MM"), Mobility Management Entity ("MME"), Machine Type Communication ("MTC"), Mobile Station International Subscriber Directory Number ("MSISDN"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Network Slice Selection Assistance Information ("NSSAI"), Packet Data Unit ("PDU", used in connection with 'FDU Session'), Public Land Mobile Network ("PLMN"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Receive ("RX"), Session Management ("SM"), Session Management Function ("SMF"), Service Provider ("SP"), Single Network Slice Selection Assistance Information ("S-NSSAI"), Transport Block ("TB"), Transport Block Size ("TBS"), Transmit ("TX"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In 5GC Rel-15, a core network ("CN") may include multiple network slices. Each network slice includes dedicated network functions to provide particular services. Each network slice may be optimized for a particular type of data traffic, such as eMBB, URLLC, mMTC, or the like. Certain network slices may require (secondary) service authentication/authorization, e.g., in addition to the primary authentication/authorization required for PLMN access. However, there currently is no mechanism for handling network-slice-specific authentication/authorization ("NSSAA") failure or the revocation of NSSAA.

BRIEF SUMMARY

Methods are disclosed for accessing a denied network resource. Apparatuses and systems also perform the functions of the methods. The methods may also be embodied in one or more computer program products comprising a computer readable storage medium that stores executable code that, when executed by a processor, perform the steps of the methods.

One method of a UE for accessing a denied network resource includes receiving at a UE a first message indicating that access to a network resource in a mobile communication network is denied due to authorization specific for the network resource. Here, the network resource is identified by at least one of: a network slice identifier (e.g., S-NSSAI) and a data network name ("DNN"). The first method includes monitoring for a condition to be met prior to initiating a new request for establishing an access to the denied network resource and initiating signaling towards the network to establish an access to the denied network resource in response to the condition being met.

One method of a network function (e.g., AMF) for accessing a denied network resource includes receiving at the network function (e.g. from AAA server) a first message indicating unavailability of a service resource in a mobile communication network (e.g., UE access is denied due to authentication or authorization specific to a network resource). The method includes determining conditions to allow to the UE to request a network resource again, the network resource corresponding to the service resource, and sending a second message to a UE indicating that access to the network resource is denied in response the first message and indicating conditions to allow to the UE to request the network resource again. The method includes maintaining a list of rejected service resources (e.g., DNN and/or S-NSSAI).

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which:

FIG. 7 is a block diagram illustrating one embodiment of a method for accessing a denied network resource; and FIG. 8 is a block diagram illustrating one embodiment of another method for accessing a denied network resource.

DETAILED DESCRIPTION

Figure 1:
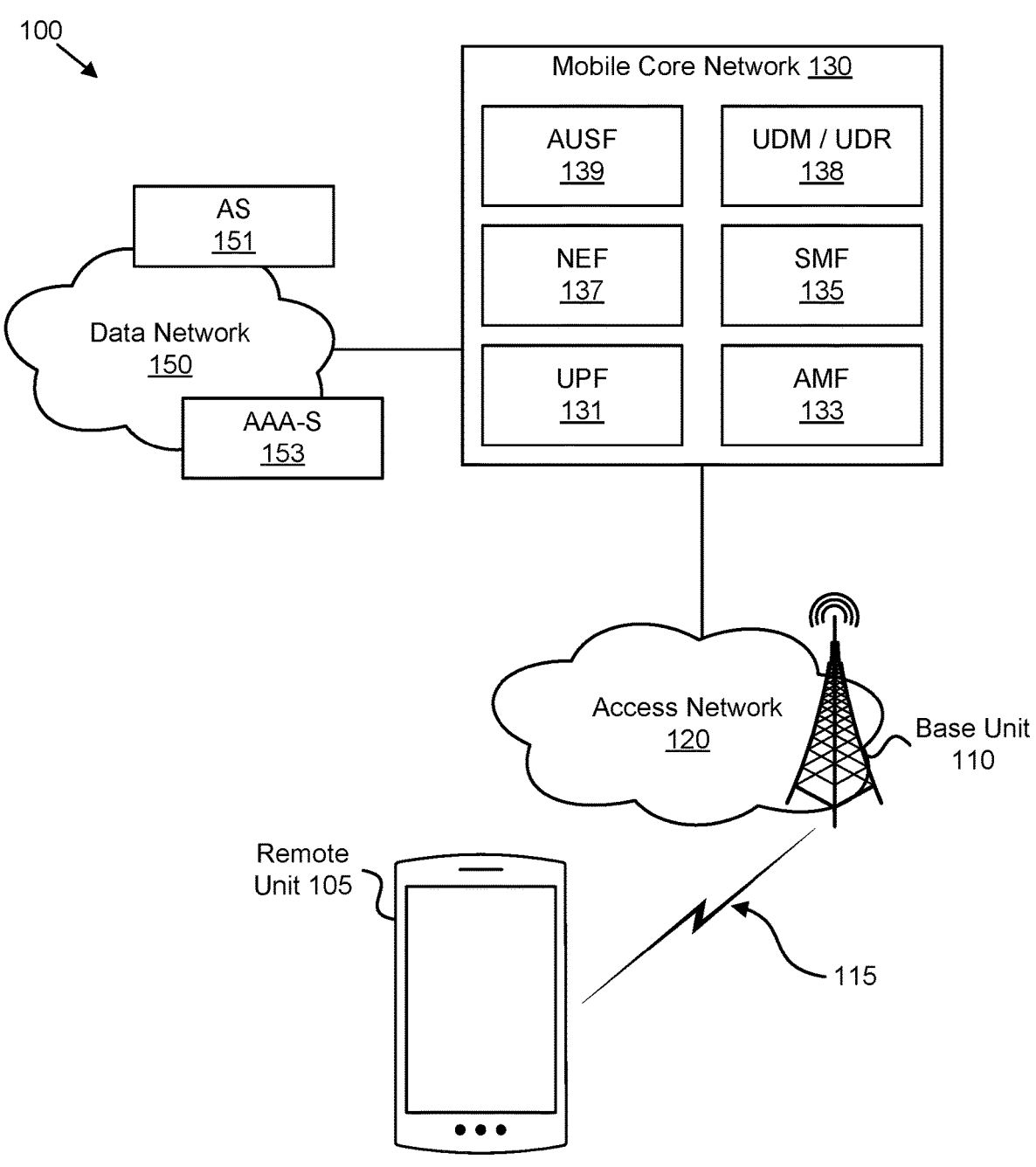
FIG. 1 is a schematic block diagram illustrating one embodiment of a wireless communication system for accessing a denied network resource.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for handling the case of a S-NSSAI being rejected due to failed slice authentication or revoked authentication/authorization. 3GPP Rel-16 is expected to provide Network Slice Access authentication and authorization specific for the Network Slice (referred to as "Network Slice Specific Authentication/Authorization", or "NSSAA") that uses User Identities and Credentials different from the 3GPP SUPI and that takes place after the primary authentication which is still required between the UE and the 5GS for PLMN access authorization and authentication. In some embodiments, Network Slice Access authentication and authorization may involve a third-party AAA server ("AAA-S") located outside the operator's domain and an AAA function ("AAA-F") within the operator's domain that acts as an AAA proxy. In certain embodiments, the AAA-F may be a NEF or AUSF (Authentication Server Function) in the operator's domain. In certain embodiments, Network Slice Access authentication may be based on EAP transport. Moreover, an AMF in the operator's domain may act as Authenticator. The AMF may send the UE an EAP ID request to create an EAP Authentication Response towards the AAA-S.

As noted above, in the case of authentication/authorization revocation, the AAA-S may initiate a re-authentication or revocation, based on AAA-S internal triggers (e.g. service usage limits were reached, available service time expired, etc.). It is assumed that the AAA-S knows the GPSI of the UE, as the GPSI has been sent to the AAA-S during the initial authentication for the network slice. Moreover, if authentication/authorization failure happens, the AMF should reject the corresponding S-NSSAI.

However, it remains unclear from the current state of the art how to handle the case of a S-NSSAI being rejected due to failed NSSAA or revoked NSSAA. Additionally, it remains unclear from the current state of the art when and how the UE is allowed to delete the rejected S-NSSAI and/or include it in the Requested NSSAI. A similar problem exists in the case of failed/revoked Secondary authentication for a PDU Session. Once the Secondary authentication for a PDU Session fails, it remains unclear from the current state of the art what the UE behavior is to be and when/how the UE is allowed to initiate again PDU Session establishment towards the same DN.

The solutions described herein are applicable for cases of a S-NSSAI being rejected due to failed NSSAA or revoked NSSAA. Additionally, the solutions described herein may be applicable for cases of failed/revoked Secondary authentication.

In a first solution, during network slice authentication (also referred to as slice-specific secondary authentication and authorization or NSSAA), if the NSSAA fails (or NSSAA has been revoked), the AMF needs to disallow the UE to use the corresponding S-NSSAI, for which NSSAA failed/was revoked. The AMF sends NAS MM message (e.g. Registration Accept message during Registration procedure or UE Configuration Update Command during UE Configuration Update procedure) to the UE including the corresponding S-NSSAI as rejected S-NSSAI.

A new reject cause for rejected S-NSSAI is introduced for failed/revoked slice authentication/authorization. Optionally an unavailability time (e.g., a kind of back-off time) to disallow further registration for the S-NSSAI may be included. Either the AAA-S or the AMF may determine and signal the unavailability timer, during which the UE is not to re-try to register to the rejected S-NSSAI. The AAA-S may enable (i.e. allow) further authentication/authorization attempts by previously failed UE—either by deleting the unavailability timer in network (e.g. in the AMF) or by explicit signaling towards the AMF with enabling cause.

In a second solution, upon failure or revocation of secondary authentication or authorization, the SMF informs the AMF about the failure or revocation and the AMF stores the status in the UE's context. New identification of a rejected PDU Session is needed: e.g. using a combination of at least one of the parameters [S-NSSAI, DNN, PDU type, SSC mode]. The second solution applies to both secondary authentication for PDU Session and secondary NSSAA.

FIG. 1 depicts an embodiment of a wireless communication system 100 for accessing a denied network resource, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

In some embodiments, a remote unit 105 may decide to establish a data connection (e.g., a PDU session) with an application server ("AS") 151 in the data network 150 via the mobile core network 130. Here, the data path of a PDU session may be established over one of the multiple network slices supported by the mobile core network 130. The specific network slice used by the PDU session may be determined by the S-NSSAI attribute of the PDU session.

Here, the remote unit 105 may be provisioned with Network Slice Selection Policy ("NSSP") rules which it uses to determine how to route a requested PDU session.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC"), which may be coupled to a data network 150, like the Internet and private data networks, among other data networks. In some embodiments, the remote units 105 communicate with an application server ("AS") 151 (external to the mobile core network 130) via a network connection with the mobile core network 130. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 130 includes several network functions ("NFs"). As depicted, the mobile core network 130 includes one or more user plane functions ("UPFs") 131. The mobile core network 130 also includes multiple control plane functions including, but not limited to, an Access and Mobility Management Function ("AMF") 133 that serves the access network 120, a Session Management Function ("SMF") 135, a Network Exposure Function ("NEF") 137, a Unified Data Management and Unified Data Repository function ("UDM/UDR") 138, and an Authentication Server Function ("AUSF") 139. Control plane network functions provide services such as UE registration, UE connection management, UE mobility management, session management, and the like. In contrast, a UPF provides data transport services to the remote units 105. In certain embodiments, the mobile core network 130 may also include, a Policy Control Function ("PCF"), a Network Repository Function ("NRF") (used by the various NFs to discover and communicate with each other over application programming interfaces ("APIs")), or other NFs defined for the 5GC.

The NEF 137 supports exposure of capabilities and events, secure provision of information from external application to 3GPP network, translation of internal/external information. As discussed above, the NEF 137 may act as an AAA function or AAA proxy to authenticate the remote unit 105 (e.g., for Network Slice Access authentication and authorization and/or for secondary authentication/authorization). Alternatively, the AUSF 139 may act as the AAA proxy. The UDM/UDR 138 comprises a Unified Data Management ("UDM") and its internal component User Data Repository ("UDR"). The UDR holds subscription data including policy data. Specifically, the policy data stored by the UDM/UDR 138 includes the NSSP.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, SGW, PGW, HSS, and the like. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed.

The network slices are logical networks within the mobile core network 130. In certain embodiments, the network slices are partitions of resources and/or services of the mobile core network 130. Different network slices may be used to meet different service needs (e.g., latency, reliability, and capacity). Examples of different types of network slices include enhanced mobile broadband ("eMBB"), massive machine-type communication ("mMTC"), and ultra-reliability and low latency communications ("URLLC"). A mobile core network 130 may include multiple network slice instances of the same network slice type. Different network slice instance of the same type may be distinguished by a slice "tenant" (also known as "slice differentiator") associated with the instance.

The first solution disclosed herein deals with the case of a rejected S-NSSAI (or PDU session establishment) due to failed/revoked authentication or authorization. During network slice authentication (e.g., NSSAA), if the NSSAA fails (or NSSAA has been revoked), the AMF 133 needs to disallow the remote unit 105 to use the corresponding S-NSSAI, for which the authentication/authorization failed or was revoked. In various embodiments, the AMF 133 sends NAS MM message (e.g. Registration Accept message during Registration procedure or UE Configuration Update Command during UE Configuration Update procedure) to the remote unit 105 including the corresponding S-NSSAI as rejected S-NSSAI.

If the S-NSSAI has been rejected due to invalid credentials, the application in the remote unit 105 may be updated with new credentials (or password) at any time after the service becomes unavailable (e.g. the S-NSSAI has been rejected). If the S-NSSAI has been rejected due to service authorization revocation, the User of service/application in the remote unit 105 may, e.g., purchase new voucher or pay or further service at any time after the service becomes unavailable (e.g. the S-NSSAI has been rejected). Consequently, the remote unit 105 may trigger Registration procedure to re-attempt registration with the rejected S-NSSAI (i.e. to include the rejected S-NSSAI in the Requested NSSAI).

Mechanisms described herein disallow the usage of S-NSSAI in the remote unit 105 temporary until the service (or S-NSSAI) becomes available for usage again. Please note that for generalization purposes, the network slice resources (e.g. identified by the S-NSSAI) or PDU Session resources are referred to herein as "network resources" or "service resources."

To handle temporarily unavailable network resources, a new reject cause for rejected S-NSSAI is introduced for failed/revoked slice authentication/authorization. Optionally, an unavailability time (e.g., a kind of back-off time) to disallow further registration for the S-NSSAI may be included. Either the AAA-S 153 or the AMF 133 may determine and signal the unavailability timer, during which the remote unit 105 is not to re-try to register to the rejected S-NSSAI.

The AAA-S 153 may enable (i.e. allow) further NSSAA attempts by previously failed remote unit 105—either by deleting the unavailability timer in network (e.g. in the AMF 133) or by explicit signaling towards the AMF 133 with enabling cause.

It is assumed that the network exposes north-bound interface (NBI, e.g. N33 interface) API allowing to AAA-S 153 or other similar Application Functions to manage or update the authentication status or authorization status of a UE (e.g., the remote unit 105) for a particular service resource (network slice or PDU Session) individually in the network (e.g. in the AMF 133). The AAA-S management of the authentication status and authorization status of a UE means e.g. either 1) to revoke an existing authentication or authorization; or 2) if authentication or authorization has failed or has been revoked, to disallow or to allow further new authentication or authorization attempts towards the remote unit 105.

The AMF 133 may perform UE Configuration Update procedure towards the remote unit 105 to delete the unavailability timer or to delete the previously rejected/denied network resource (S-NSSAI or PDU Session), so that the remote unit 105 may trigger NAS registration procedure to request the S-NSSAI. The first solution is described in greater detail below with reference to FIGS. 3A-3B.

The second solution disclosed herein addresses the case of (Secondary) authentication for PDU Session. Note that the secondary authentication/authorization during the establishment of a PDU session may be optionally used for NSSAA. Therefore, the procedures associated with the second solution may apply to both 1) secondary authentication for PDU Session and 2) secondary NSSAA.

In the second solution, upon failure or revocation of the authentication or authorization the SMF 135 informs the AMF 133 about the failure or revocation and the AMF 133 stores the status in the UE's context. New identification of a rejected PDU Session is needed: e.g. using a combination of at least one of the parameters [S-NSSAI, DNN, PDU type, SSC mode]. The second solution is described in greater detail below with reference to FIGS. 4A-4B.

Figure 2:
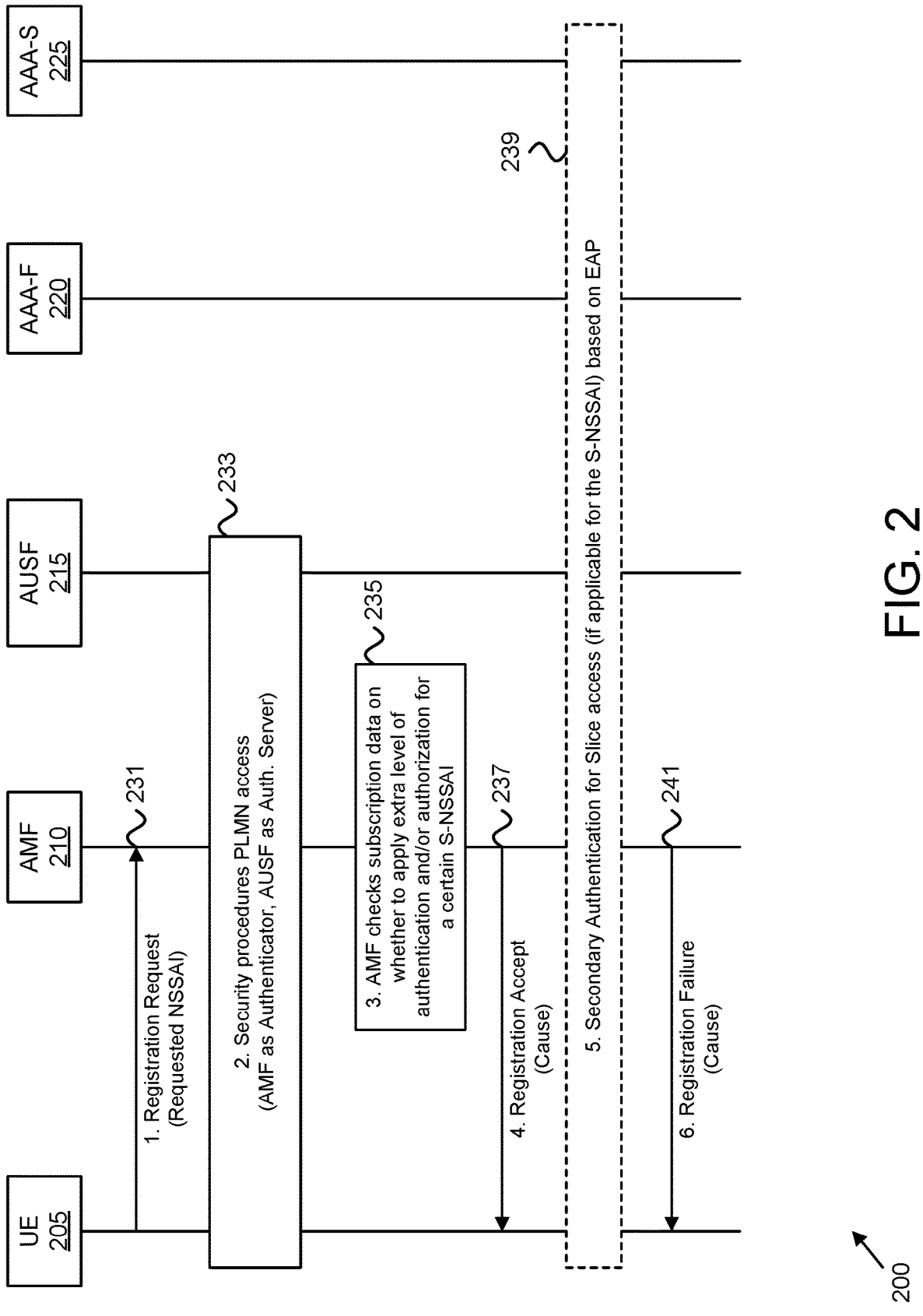
FIG. 2 is a diagram illustrating a network procedure for handling the case of a S-NSSAI being rejected due to failed slice authentication or revoked authentication/authorization.

FIG. 2 depicts a network procedure 200 for accessing a denied network resource, according to embodiments of the disclosure. The network procedure 200 involves a UE 205, an AMF 210, an AUSF 215, an AAA-F 220, and an AAA-S 225. Here, the UE 205 may be one embodiment of the remote unit 105, the AMF 210 may be one embodiment of the AMF 133, the AUSF 215 may be one embodiment of the AUSF 139, and the AAA-S 225 may be one embodiment of the AAA-S 153. The AAA-F 220 acts as an AAA proxy within the 5GC, where the AAA-S 225 is an external server. In one embodiment, the AAA-F 220 is the NEF 137. In other embodiments, the AUSF 215 may act as the AAA proxy within the 5G core network. Therefore, in such embodiments, the signaling between AUSF 215 and AAA-F 220 may be internal to the AUSF 215, or may be eliminated as unnecessary.

At Step 1, the UE 205 sends a registration request (see messaging 231). The registration request includes NSSAI requested by the UE 205.

At Step 2, the UE 205, the AMF 210, and the AUSF 215 implement security procedures for PLMN access (e.g., perform primary authentication/authorization, see block 233). Here, the AMF 210 acts as authenticator, while the AUSF 215 acts as authentication server.

In Step 3, the AMF 210 checks subscription data to determine whether to apply an extra level of authentication and/or authorization (e.g., NSSAA) for certain S-NSSAI (see block 235). Here, it is assumed that the AMF 210 determines that the extra level of authentication/authorization is needed.

In Step 4, the AMF 210 sends Registration Accept to the UE with indication that NSSAA is pending. Furthermore, if all S-NSSAIs requested by the UE or subscribed default S-NSSAIs are subject of NSSAA which is to be performed (i.e. there is no stored NSSAA result in the UE's context in the AMF), the AMF may include no Allowed NSSAI parameter or empty Allowed NSSAI parameter (see messaging 237). In one embodiment, the 'pending' indication is a signal that the UE 205 is to wait for additional indication from the AMF 210 to allow the use of the S-NSSAI.

In Step 5, at least the UE 205, AMF 210 and AAA-S 225 perform secondary authentication and authorization (e.g., NSSAA) for access to the network slice identified by the S-NSSAI (see block 239). Note that the NSSAA may an EAP-based exchange. Here, it is assumed that the NSSAA fails.

In Step 6, the AMF 210 indicates registration failure to the UE 205 (see messaging 241). In various embodiments, the AMF 210 includes a cause value to indicate the reason for the registration failure. Specifically, the cause value may indicate 1) that the network resource (e.g., one or more requested S-NSSAIs) is unavailable and 2) that the reason is due to failed NSSAA. Moreover, the cause value may indicate conditions to be met before the UE 205 attempt again to establish access to the network resource. The AMF 210 may provide a list of Rejected S-NSSAIs, each of them with the appropriate rejection cause value, if the AMF 210 determines that no S-NSSAI can be provided to the UE 205 in the Allowed NSSAI.

Figure 3A:
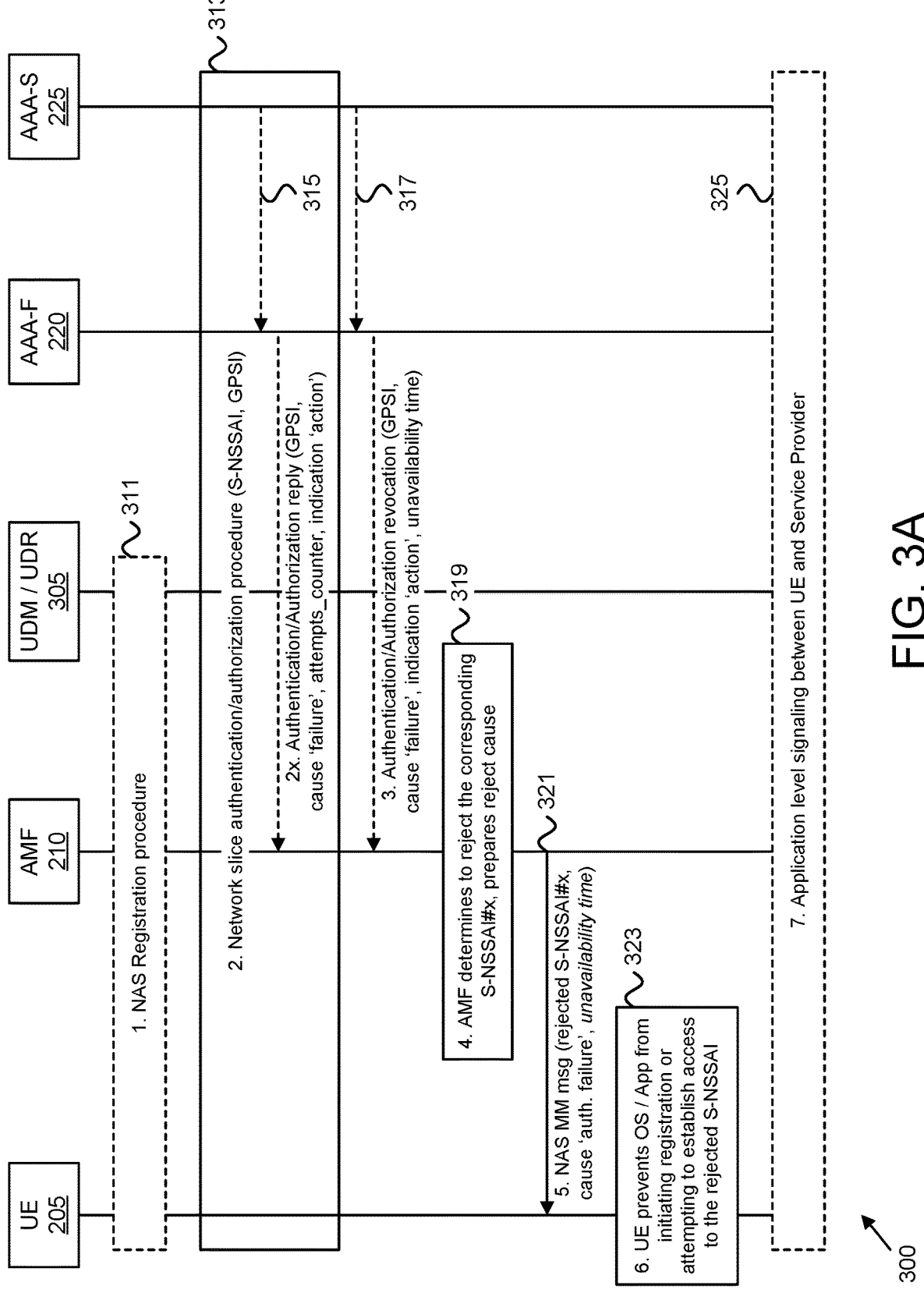
FIG. 3A is a diagram illustrating one embodiment of signaling flow for updating (disabling and enabling) network slice authentication/authorization status in the network.
Figure 3B:
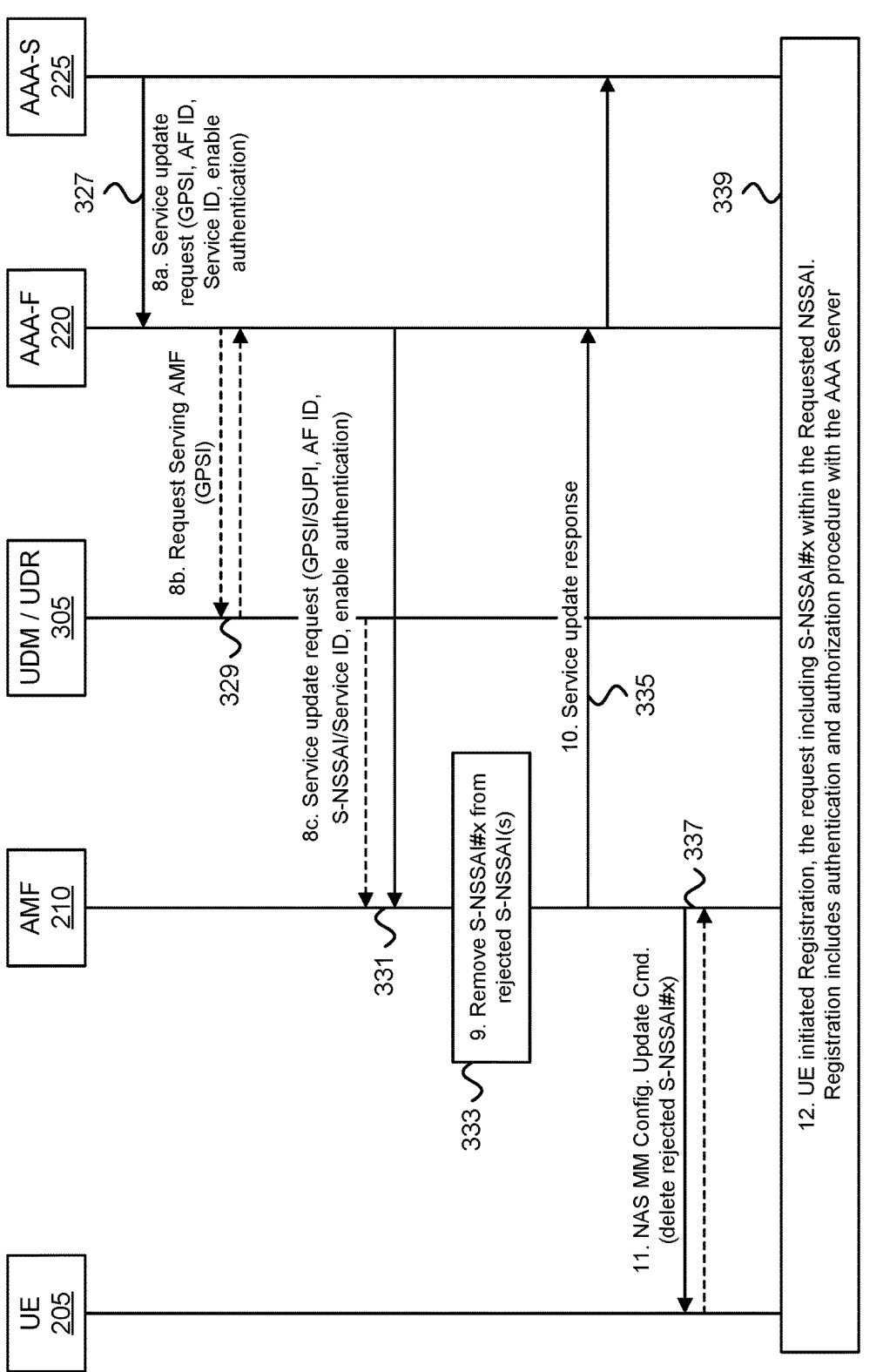
FIG. 3B is a continuation of FIG. 3A.

FIGS. 3A-3B depict signaling flow of a network procedure 300 for the updating (e.g., disabling and/or enabling) of network slice authentication/authorization status in the network. As depicted, the procedure 300 involves the UE 205, the AMF 210, a UDM/UDR 305, the AAA-F 220), and a service provider authentication function ("SP-AF," the AAA server 225). Here, the UDM/UDR 305 may be one embodiment of the UDM/UDR 138. Note that the AAA-F 220 may be the AUSF 139 and/or AUSF 215. Alternatively, the AAA-F 220 may be the NEF 137.

The network procedure 300 begins at Step 1 as the UE 205 initiates a Registration procedure towards a PLMN (see block 311). Here, the PLMN includes the AMF 210, UDM/UDR 305, and AAA-F 220. Note here that the UE 205 may include Requested NSSAI in a Registration request.

At Step 2, the network (e.g. the AMF 210) determines that Network Slice authentication or authorization for a particular S-NSSAI (e.g., of the Requested NSSAI) is required and the network performs the procedure for NSSAA towards AAA-S 225 (see block 313). In one embodiment, the NSSAA may be performed as part of the NAS registration procedure. In another embodiment, the NSSAA may be triggered at a later time and not as part of the Registration procedure. Note that the NSSAA procedure may be performed, e.g., as EAP-based exchange and may include signaling exchanges between the UE 205 and AAA-S 225, e.g. EAP challenge/response messages.

In certain embodiments, the NSSAA is unsuccessful and Step 2X is triggered (see messaging 315). At Step 2X, if the AAA-S 225 fails to authenticate the UE 205, then at the end of the authentication/authorization procedure the AAA-S 225 indicates authentication or authorization failure to the authenticator, i.e., to the AMF 210. Optionally, the AAA-S 225 may inform the authenticator (e.g., the AMF 210) about the number (e.g. upper limit) of authentication/authorization attempts (or failures). The AMF 210 may store the upper limit of authentication/authorization attempts. If this upper limit (e.g. 3 attempts) has been reached, then the AMF 210 may cease sending further authentication/authorization signaling towards the AAA-S 225 for this network slice. Additionally, the AAA-S 225 may indicate to the AMF 210 a further 'action' to be taken upon failure, as further described in step 3.

In certain embodiments, the NSSAA is successful, but is later revoked and Step 3 is triggered (see messaging 317). At Step 3, the AAA-S 225 initiates a revocation of an authentication/authorization based on AAA-S 225 internal triggers (e.g. service usage limits were reached, available service time expired, key renewal, etc.). The AAA-S 225 knows the GPSI from the initial authentication for the network slice. The AAA-S 225 includes an appropriate failure cause to enable the AMF 210 to take corresponding actions.

For example, the AAA-S 225 may send the message Authentication/Authorization revocation request (GPSI, cause 'no access', indication 'action', unavailability time). The indication 'action' upon failure (which may be present in Steps 2X and 3) is meant for the authenticator (e.g. AMF 210) and may be implemented either as an existing parameter (e.g. within a failure cause) or as a new parameter. The indication 'action' upon failure may have various meanings or values, for example, at least one of: Re-authentication/authorization is required; No more authentication/authorization requests are permitted; No more authentication/authorization requests are permitted, but keep the UE reachable for updates (e.g. because UE credentials have expired); No more authentication/authorization requests are permitted, and re-authentication will be triggered by explicit signaling from the AAA-S or AF; and/or No more authentication/authorization requests are permitted during the next "unavailable time". After timer expires, (re-)authentication/authorization may be triggered.

As described for the indication 'action' upon failure, the AAA-S 225 may request the authenticator (e.g., AMF 210) not to re-initiate the authentication until further explicit indication from the AAA-S 225 or until a particular (authorization) unavailability time expires.

Step 4 is implemented at the AMF 210 in response to the message of Step 2X or Step 3 (see block 319). Here, the AMF 210 stores (locally) a status of the failed authentication or revoked authorization in the UE's context. The AMF 210 matches the particular signaling exchange for authentication/authorization failure with a particular S-NSSAI (referred to as "S-NSSAI # x") or in general with particular combination of parameters [DNN, S-NSSAI]. While described herein as "[DNN, S-NSSAI]" in other embodiment the order of the parameters may be changed, for example provided as [S-NSSAI, DNN].

If the authentication/authorization to S-NSSAI # x has failed (e.g., upon a pre-defined number of authentication attempts), then the AMF 210 determines the failed S-NSSAI # x to be sent as 'Rejected S-NSSAI' to the UE 205 and, correspondingly, determines Allowed NSSAI (which excludes the failed S-NSSAI # x). Note that if an S-NSSAI is part of the Allowed NSSAI it does not mean that connection is established with the network slice identified by the S-NSSAI. Rather, the UE has gained access and can establish connectivity towards the S-NSSAI.

If the authentication/authorization to S-NSSAI # x, which is already in use, is revoked, then the AMF 210 triggers actions to release the associated PDU Session(s), if existing/available, and to inform the UE 205 about a new Allowed NSSAI (e.g. excluding the revoked/failed S-NSSAI # x). The AMF 210 provides new rejected NSSAIs to the UE 205 including the S-NSSAI(s) for which authorization has been revoked. If no S-NSSAI is left in Allowed NSSAI for an access after the revocation, and a Default NSSAI exists that requires no Network Slice Specific Authentication or for which a Network Slice Specific Authentication did not previously fail over this access, then the AMF 210 may provide a new Allowed NSSAI to the UE 205 containing the Default NSSAI. However, if no S-NSSAI is left in Allowed NSSAI for an access after the revocation, and no Default NSSAI can be provided to the UE 205 in the Allowed NSSAI or a previous Network Slice Specific Authentication failed for the Default NSSAI over this access, then the AMF 210 may initiate a network-initiated Deregistration procedure for the access and send to the UE 205 in an explicit De-Registration Request message the list of Rejected S-NSSAIs, each of them with the appropriate rejection cause value.

Additionally, the AMF 210 may determine the required UE behavior, e.g. an action that the UE 205 is to take when receiving the disallow/reject indication. One example is to use an unavailability time (also referred to as "forbidden time") for re-attempting the (re-)authentication or (re-)authorization. Unavailability time is discussed in further detail at step 5.

If the failure cause or indication 'action' in Steps 2X or 3 indicates that re-authentication or re-authorization is required, then the AMF 210 triggers an authentication/authorization request towards the UE 205 to perform the signaling as per step 2. While the (re-)authentication/authorization procedure is running, the AMF 210 does not release the associated PDU session(s), if available. After the (re-)authentication/authorization, the AMF 210 performs the one of the following procedures depending on the result: A) If the (re-)authentication/authorization fails, the AMF 210 initiates signaling to release the associated PDU session(s), if available, and afterwards initiates NAS MM signaling to the UE 205 as in step 5; B) If the (re-)authentication/authorization is successful, the AMF 210 stores the result in the UE's context and does not perform additional signaling.

In one option, the AMF 210 may not send the unavailability time to the UE 205, but stores the time locally in the AMF 210. After the time expires, the AMF 210 may send signaling to the UE 205 to delete the rejected S-NSSAI # X, as discussed below in step 11.

At Step 5, the AMF 210d sends a NAS MM message to the UE 205 to reject the S-NSSAI (e.g. S-NSSAI # x) with an appropriate reject cause (see messaging 321). Either an existing reject cause may be used, or a new reject cause used to indicate to the UE 205 that the S-NSSAI is not allowed to be used due to e.g. 'failed authentication' or 'revoked authorization' or another appropriate cause. In addition, or as part of the reject cause, the AMF 210 may include an associated '(reject) action' for the UE 205 on how to behave for this rejected S-NSSAI.

For example, the indication '(reject) action' is determined in the AMF 210 upon the indication 'action' upon failure received in Step 2X or 3 or based on configuration in the AMF 210. In one embodiment, the indication '(reject) action' indicates that the UE 205 is to wait for additional indication from the network (e.g. AMF 210) to allow the use or re-request registration with this 5-NSSAI # x. In another embodiment, the indication '(reject) action' indicates an unavailability time for which the UE 205 is not allowed to initiate registration for the rejected S-NSSAI # x (this back-off time may be determined internally in the AMF 210 or based on signaling from the AAA-S 225). In a further embodiment, the indication '(reject) action' indicates that if the application layer (in the UE 205) indicates new credentials to NAS layer, then the NAS layer (in the UE 205) may re-attempt registration with this S-NSSAI # x (e.g. by including the S-NSSAI # x in the Requested NSSAI).

The NAS MM message may be Registration Accept or Registration Reject message (e.g. in case of Authentication failure as in Step 2X) or UE Configuration Update Command message (e.g. in case of Authentication revocation as in step 3) containing rejected S-NSSAI (e.g. S-NSSAI # x), cause value (e.g. 'authentication failure', or 'authorization revoked', or 'no access to this S-NSSAI', etc.), and possibly an indication for '(reject) action' as described above.

If the UE 205 has included S-NSSAI(s) in the Requested NSSAI in the Registration Request message in step 1, and the authentication or authorization for all requested S-NSSAI(s) fails (e.g. as per Step 2X), or if the UE 205 has not included any requested NSSAI, but all (default) Subscribed S-NSSAI(s) are marked for authentication required and the authentication/authorization fails, then the AMF 210 may proceed at least in one of the following ways (e.g. based on network configuration and/or based on the indication 'action' upon failure received from the AAA-S 225).

If there are no more subscribed S-NSSAIs in the UE's context in the AMF 210 (e.g. the simplest use case is the UE 205 having a single Subscribed S-NSSAI), then the AMF 210 sends Registration Reject message to the UE 205 indicating a failure cause due to failed network slice authentication or authorization, and optionally unavailability time. The UE 205 would stay in RM-Deregistered state. The UE 205 may re-attempt the registration procedure after expiration of some time, e.g. unavailability time.

If the UE 205 has multiple subscribed S-NSSAIs, which are not marked as default S-NSSAI, then the AMF 210 may sends Registration Reject message to the UE 205 indicating a failure cause due to failed network slice authentication or authorization for the requested S-NSSAI # x, and optionally indicate that registration with other S-NSSAI may be possible. The UE 205 would stay in RM-Deregistered state. The UE 205 may re-attempt registration procedure including S-NSSAI(s) different from the previously rejected S-NSSAI # x. Note that the AMF 210 may include in the rejection message list of Rejected S-NSSAIs, each with an appropriate rejection cause value.

In addition to any of the above cases, when the AMF 210 sends Registration Reject message to the UE 205, the AMF 210 may also include an indication that restricted access to local operator services (e.g. ARLOS) is possible. The ARLOS indication may enable the UE 205 to have a restricted user plane (e.g. IP) access in order to allow the UE 205 some specific services, e.g. provision the UE 205 with new credentials for the network slice-based authentication or authorization is needed. The UE 205 would stay in RM-Registered state. Alternatively, the ARLOS indication may allow SMS service, which also may be used for provisioning the UE 205 with new credentials for network slice-based authentication or authorization.

Alternatively, the AMF 210 may send a Registration Accept message including at least one of the following indications: 1) requested S-NSSAI # x as rejected S-NSSAI; 2) no Allowed NSSAI parameter or empty Allowed NSSAI (i.e., no S-NSSAI(s) inside the Allowed NSSAI parameter; this may be sent when the authentication/authorization is pending, but delayed due to network congestion, waiting on user input, etc.); 3) SMS-related configuration; and/or 4) an indication that the registration does not allow any PDU Session establishment. Here, the UE 205 would be in RM-Registered state. Note that the UE 205 would be in a kind of limited service state due to failed slice-based authentication/authorization, but successful network access authentication. Upon reception of no/empty Allowed NSSAI, the UE 205 may determine that control plane service services, e.g. SMS or location services, may be used, but no PDU Session(s) may be established. The UE 205 would be able to use Emergency services. The network would be able to provision the UE 205 via the control plane, e.g. with new URSP, or Configured NSSAI or security credentials or other information. The network may trigger a network slice-based (re-)authentication/authorization at any time.

If the UE 205 has additional subscribed S-NSSAI(s) marked as default, the AMF 210 may send Registration Accept message including Allowed NSSAI having the value of the default S-NSSAI(s). The AMF 210 includes the requested S-NSSAI # x as rejected S-NSSAI. Alternatively, if the NSSAA fails for all S-NSSAIs in the Allowed NSSAI, the AMF 210 may initiate a network-initiated Deregistration procedure and send to the UE 205 an explicit De-Registration Request message that includes the list of Rejected S-NSSAIs, each of them with the appropriate rejection cause value.

At Step 6, the UE 205 avoids further attempts to register for the network/service resources associated with the rejected S-NSSAI # x (see block 323). The UE 205 stores the rejected S-NSSAI # x in the list of rejected S-NSSAI(s) together with the associated reject cause. If unavailability time was included in the NAS message from the AMF 210, the UE 205 starts a timer with value of unavailability time. After the timer expires, the UE 205 may autonomously delete the associated rejected S-NSSAI # x from the list of rejected S-NSSAI(s) and the UE 205 may initiate, e.g. upon request from upper layers, a registration procedure to include the S-NSSAI # x in the Requested NSSAI.

If the UE 205 has received a Registration Reject due to failed slice authentication/authorization for the requested S-NSSAI # x, then the UE 205 determines that the reject is not due to primary network access authentication/authorization. Thus, the UE 205 is allowed to initiate another Registration procedure with the same network including S-NSSAI(s) different from the rejected S-NSSAI # x. The UE 205 may also initiate another Registration procedure without including any Requested NSSAI. This would allow the network to successfully register the UE 205 if the Subscribed S-NSSAIs include another S-NSSAI(s) different from the S-NSSAI # x.

At optional Step 7, Application level signaling is exchanged between the UE's application and the service provider's application server (see block 325). For example, this signaling may be used to buy new credits at the service provider or acquire new credentials with the service provider. This signaling may be initiated from the service provider towards the UE 205 or from the UE 205 to the service provider (e.g. via another existing PDU Session or via control plane signaling (e.g. via NEF 137)).

Continuing on FIG. 3B, at Step 8a the AAA-S 225 may update the status in the network (e.g., to enable the network slice authentication or authorization for a particular UE 205 in the AMF 210) based on service provider triggers (e.g. based on step 7 signaling exchange, see messaging 327). The AAA-S 225 sends a service update request message to enable the slice authentication or authorization for the particular UE 205, for which previous authentication or authorization has failed or has been revoked. The Service update request may include at least one of the: UE ID (e.g. GPSI), AF ID, Service ID, request indication (e.g. enable authentication).

At Step 8b, the GPSI may be used as UE identifier by the signaling from the AAA-S 225 and the AAA-F 220 may discover the Serving AMF 210 via interaction with the UDM/UDR 305. The AF ID identifies the AAA-S 225. The "request indication" is used in the authenticator (e.g. AMF 210 or SMF) to determine the requested action, e.g. enable authentication or delete unavailability time, etc. For example, the AAA-S 225 may use the service operation Nnef ParameterProvision Update Request to the AAA-F 220. This signaling may be also used by the AAA-S 225 to trigger the AMF 210 to initiate re-authentication procedure.

At Step 8b, the AAA-F 220 may need to determine the current Serving AMF for the UE. The AAA-F 220 performs UE location retrieval with the UDM/UDR using the GPSI as reference identifier (see messaging 329).

At Step 8c, the AAA-F 220 sends Service update request message to the AMF 210 (see messaging 331). The Service request message includes the information from the AAA-S 225 about the enablement of authentication or authorization for the UE 205 for the particular network/service resources. The AMF 210 may resolve the Service ID (or service descriptor, originating from the AAA-S) into an S-NSSAI valid in the serving PLMN and which is part of the UE's Subscribed S-NSSAIs. Alternatively, the Service ID may be resolved to a S-NSSAI in the AAA-F 220.

Alternatively, as shown in dotted line, the Service update request in Step 8c may come from the UDM/UDR 305, if no direct signaling between the AMF 210 and AAA-F 220 is possible. In this case the UDM/UDR 305 notifies the subscribed Network Function (e.g., AMF 210) of the updated subscriber data via Nudm_SDM_Notification Notify service operation.

At Step 9, the AMF 210 processes the received Service request message to enable the authentication or authorization of the UE 205 for the corresponding service resource (e.g. S-NSSAI or PDU session, see block 333). The AMF 210 identifies the associated S-NSSAI based on the received Service request, e.g. based on the Service ID, or AAA-S ID or AF ID. If the AMF 210 has stored in the UE's context the associated S-NSSAI as rejected S-NSSAI and if unavailability time is stored, then the AMF 210 removes the S-NSSAI from the list of rejected S-NSSAIs and deletes the unavailability time.

At Step 10, the AMF 210 sends Service response to the AAA-S 225 to inform the AAA-S 225 whether the Service request has been successfully processed (e.g. stored for processing) or not (see messaging 335). For example, if the UE 205 is not registered in the network anymore, the network cannot update the UE 205. In case of failure to process the Service request message, the AMF 210 indicates an appropriate failure cause. Note that transition of the UE 205 into Deregistered state means that the UE 205 would delete the Rejected S-NSSAI(s), so that at next Registration procedure, the UE 205 would include possibly all S-NSSAIs from the Configured NSSAI in the Requested NSSAI. This means that if UE 205 has deregistered and is unreachable for the AMF 210, then the network slice authentication would work during next registration procedure.

At Step 11, the AMF 210 uses NAS procedure to update the UE 205 in order to enable the initiation of registration to the network/service resources (e.g. Network Slice authentication or authorization to previously rejected S-NSSAI # x (or PDU Session establishment), see messaging 337). For example, the AMF 210 may send NAS MM UE Configuration Update Command message including a new list of rejected S-NSSAI(s) excluding the associated S-NSSAI # X. If the UE 205 is in CM-IDLE state (or Mobile Initiated Connection Only (MICO) mode, i.e., unreachable currently for mobile terminated services), then the AMF 210 waits until the UE 205 moves to CM-Connected state to trigger the UE update. Upon reception of the NAS message from the AMF 210, the UE 205 removes the S-NSSAI from the list of rejected S-NSSAI and, if corresponding unavailability timer is running, the UE 205 deletes the timer.

At Step 12, based on upper layer triggers (e.g. App layer updates the EAP client), the EAP client or the Application in the UE 205 may request the NAS layer to re-attempt a registration with the rejected S-NSSAI (see block 339). The NAS layer initiates NAS Registration procedure containing a Requested NSSAI which includes the S-NSSAI # x which was enabled by the AMF 210 in Step 11.

Note that in Steps 2X or 3 there is an association (e.g., DIAMETER or RADIUS protocol connection) between the AAA-S 225 and the authenticator (e.g. AMF 210 or SMF). However, in step 8a, 8b, 8c there is no existing association between the AAA-S 225 and the authenticator. Therefore, the AAA-S 225 may include in the signaling exchange with the network a service ID (in addition to the UE ID (e.g. GPSI) and AF ID) to identify the service and to allow the network to resolve the associated network slice identified by the S-NSSAI. The service ID may have various formats and one possible format may be a kind of service descriptor (which may in addition include the originator identifier), e.g. "SmallData_infrequent_IP_ReportingService" or "frequent_non-IP_TrackingService", or "NonPeriodic_IP_TelemetryService", etc.

Figure 4A:
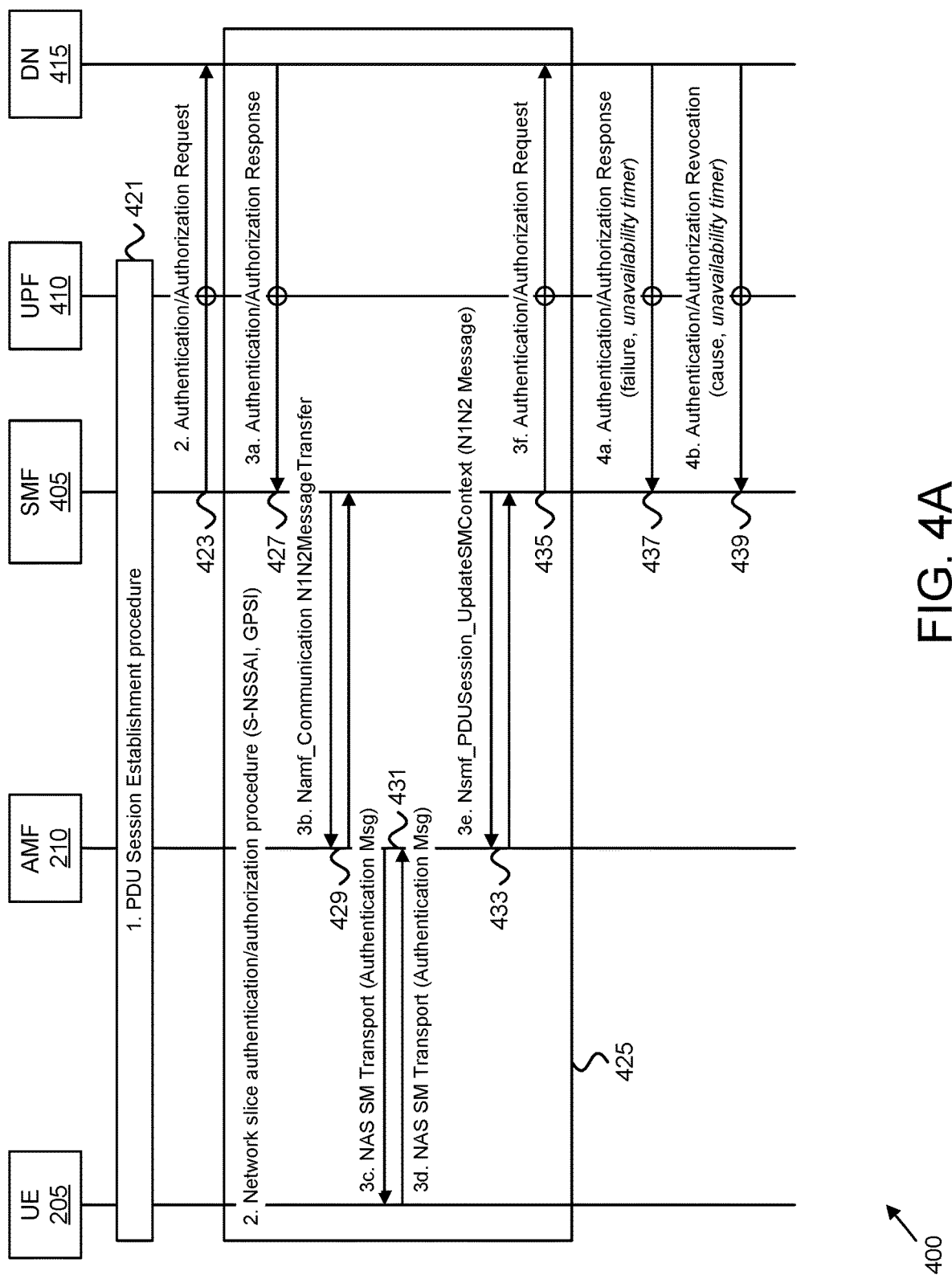
FIG. 4A is a diagram illustration another embodiment of signaling flow for disabling and enabling PDU session establishment towards a DN.
Figure 4B:
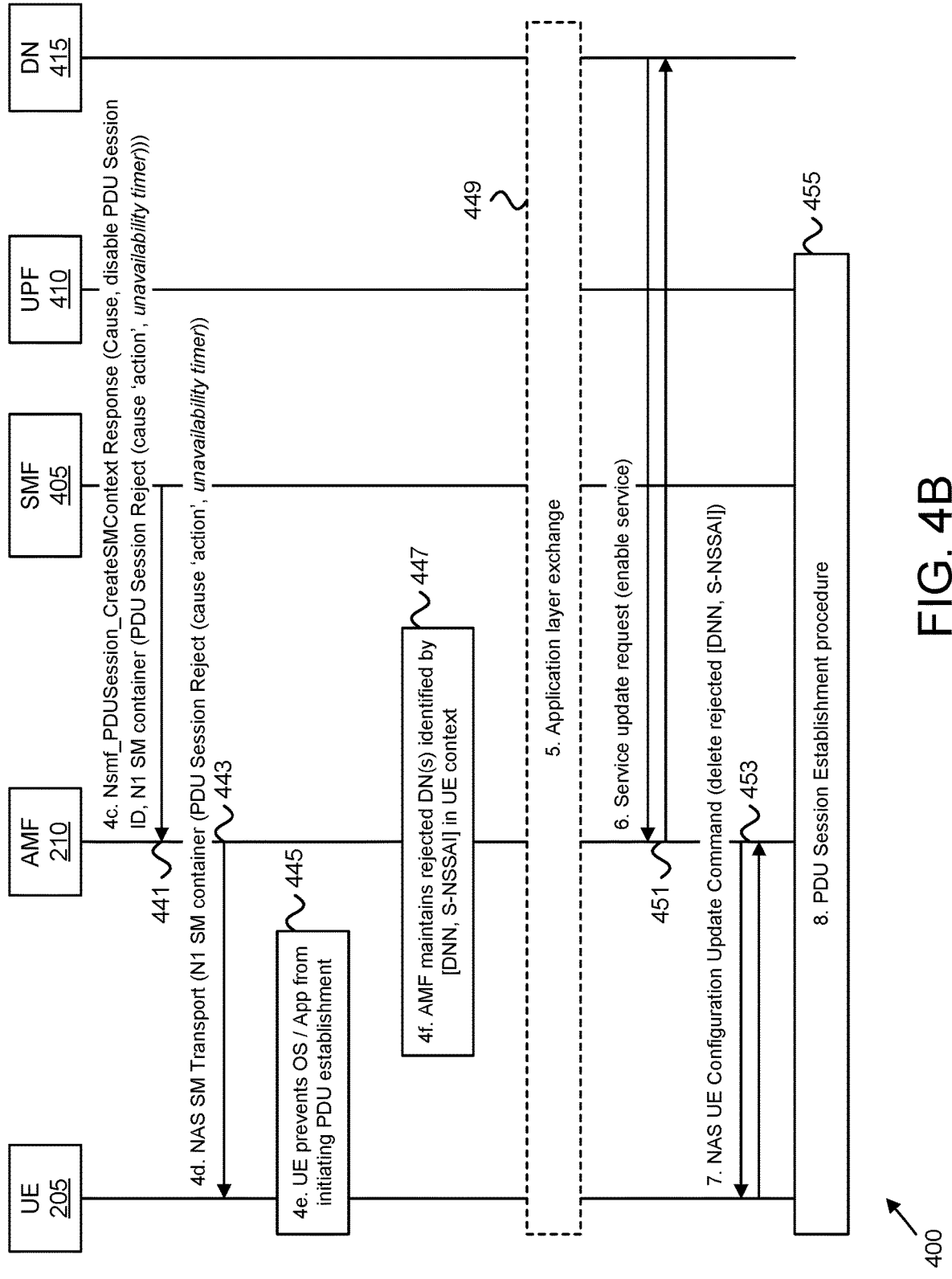
FIG. 4B is a continuation of FIG. 4A.

FIGS. 4A-4B depict signaling flow of a network procedure 400 for the updating (e.g., disabling and/or enabling) of network slice authentication/authorization status in the network. As depicted, the network procedure 400 involves the UE 205, the AMF 210, a SMF 405, a UPF 410, the AAA-F 220 (which may be an NEF or AUSF functioning as AAA proxy), and a service provider authentication function (e.g., AAA-S 225) in the data network ("DN") 415. Here, the SMF 405 UPF 410 may be embodiments of the SMF 135 and UPF 131, respectively.

The network procedure 400 begins at Step 1 as the UE 205 performs PDU Session Establishment with a 5GC (see block 421). In one embodiment, the procedure of UE-requested PDU Session Establishment, may be as described in clause 4.3.2.2.1 of 3GPP TS 23.502, which is incorporated herein by reference.

Secondary authentication is performed for the PDU Session (see block 425), e.g., according to clause 4.3.2.3 in TS23.502, which is incorporated herein by reference. The PDU Session establishment authentication/authorization is optionally triggered by the SMF 405 during a PDU Session establishment and performed transparently via a UPF 410 or directly with the DN-AAA server without involving the UPF 410 if the DN-AAA server is located in the 5GC and reachable directly.

At step 2, the SMF 405 initiates the authentication procedure with the DN-AAA via the UPF 410 to authenticate the DN-specific identity provided by the UE 205, e.g., as specified in TS 29.561 (see messaging 423). When available, the SMF 405 provides the GPSI in the signaling exchanged with the DN-AAA server. The UPF 410 transparently relays the message received from the SMF 405 to the DN-AAA server. Note that the DN-AAA server may be one embodiment of the AAA-S 153 and/or AAA-S 225.

At step 3a, the DN-AAA server sends an Authentication/Authorization message towards the SMF 405 (see messaging 427). The message is carried via the UPF 410. At Step 3b, the DN Request Container information received from DN-AAA is transferred towards the UE 205 (see messaging 429). In non-roaming and LBO cases, the SMF 405 may invoke the Namf_Communication_N1N2MessageTransfer service operation on the AMF 210 to transfer the DN Request Container information within N1 SM information sent towards the UE 205. In the case of Home Routed roaming, the H-SMF may initiate a Nsmf_PDUSession_Update service operation to request the V-SMF to transfer DN Request Container to the UE 205 and the V-SMF invokes the Namf_Communication_N1N2MessageTransfer service operation on the AMF 210 to transfer the DN Request Container information within N1 SM information sent towards the UE 205. In Nsmf_PDUSession_Update Request, the H-SMF additionally includes the H-SMF SM Context ID.

At Step 3c, the AMF 210 sends the N1 NAS message containing the authentication message to the UE 205 and the UE 205 transfers DN Request Container information to the AMF 210 towards the DN-AAA (see messaging 431). At Step 3e, when the UE 205 responds with a N1 NAS message containing DN Request Container information, the AMF 210 informs the SMF 405, e.g., by invoking the Nsmf_P-DUSession_UpdateSMContext service operation (see messaging 433). The SMF 405 issues an Nsmf_PDUSession_UpdateSMContext response. In the case of Home Routed ("HR") roaming, the V-SMF relays the N1 SM information to the H-SMF using the information of PDU Session received in step 3b via a Nsmf_PDUSession_Update service operation.

At Step 3f, the SMF 405 (in HR case it is the H-SMF) sends the content of the DN Request Container information (authentication message) to the DN-AAA server via the UPF 410 (see messaging 435).

In Step 4a, the Secondary authentication for the PDU Session is unsuccessful and so the DN 415 sends an Authentication/Authorization Response message that includes the failure cause and may optionally include an unavailability time (see messaging 437). The unavailability time indicates the time for which the network should not re-attempt authentication/authorization towards the DN 415.

At Step 4*b*, the DN 415 may optionally revoke already existing connection towards to the DN 415 (see messaging 439). The revocation may be triggered by the DN 415 (e.g., the DN-AAA server) due to expired usage allowance or any other reason. The DN 415 (or DN-AAA server) knows the UE's GPSI used from the step 3 above. The Authentication/Authorization revocation message includes an appropriate failure cause to enable the AMF 210 to take corresponding actions and optionally an unavailability time.

Continuing on FIG. 4B, at Step 4*c* the SMF 405 informs the AMF 210 about the failed/revoked access to the PDU Session for this UE 205 (see messaging 441). For example, the SW 405 may use Nsmf_PDUSession_CreateSMContext Response service operation including, e.g., failure/reject Cause, disable PDU Session ID (to AMF), N1 SM container (PDU Session Reject (Cause 'action', unavailability timer)).

The failure cause or reject cause sent from the SMF 405 to the AMF 210 within the N11 signaling may be similar to the indication 'action' upon failure as described in Step 3 in FIG. 3A. The N1 SM container is to be carried towards the UE 205 transparently to the AMF 210. The PDU Session Reject message may contain Cause 'action' and unavailability time. The unavailability time is used in the UE 205 according to Step 4*e*.

At Step 4*d*, the AMF 210 sends NAS downlink (DL) Transport message comprising the N1 SM container (Cause 'action', unavailability timer) via RAN (see messaging 443, RAN not depicted). The N1 SM container is as received from the SMF 405. In various embodiments, the AMF 210 and SW 405 may delete the existing N11 association for this UE 205.

At Step 4*e*, if the UE 205 received a PDU Session establishment rejection (or release) due to authentication/authorization failure or revocation included in SW-originated NAS SM signaling message (or alternatively in AMF-originated MM signaling), the UE 205 stores the rejected PDU Session identified by the combination of at least parameters [DNN, S-NSSAI] (see block 445). In certain embodiments, the UE 205 may maintain a list of rejected PDU Session(s) identified at least by the combination of parameters [DNN, S-NSSAI]. The UE 205 may store the rejected PDU Session identified by the combination of at least parameters [DNN, S-NSSAI] until the UE 205 transitions to RM-Deregistered state.

If the authentication/authorization failure is network slice-specific, the UE 205 may additionally receive a '(reject) action' indication similarly to step 5 in FIG. 3A and the UE 205 would behave accordingly. If the authentication/authorization failure is for PDU Session establishment, the UE 205 determines how to behave based on the reject/failure cause value. For example, the UE 205 is not to initiate any further PDU Session establishment procedures to this PDU session, e.g. combination of parameters [DNN, S-NSSAI]. Note that the UE 205 does not have SM context associated with the parameters [DNN, S-NSSAI] and the UE 205 rather marks internally that requests towards a connection to [DNN, S-NSSAI] is temporarily not allowed.

If the PDU Session was already established and this is authentication/authorization revocation, then the UE 205 is to release the existing PDU Session resources and the UE 205 is not to initiate any PDU Session establishment procedures to this PDU session, e.g., combination of parameters [DNN, S-NSSAI]. The UE 205 is not to initiate any PDN connection procedure for the corresponding APN when UE 205 moves to EPS in IDLE or in CONNECTED mode.

If the unavailability timer is provided, the UE 205 is not to initiate signaling to this PDU Session during the unavailability timer is running. After the timer expiration, the UE 205 may re-attempt the PDU Session establishment. If the UE 205 has a single subscribed at least one of [DNN, S-NSSAI] which failed or if all subscribed [DNNs, S-NSSAI(s)] require secondary authentication/authorization which failed, then the UE 205 is not allowed to establish any PDU Session, however the UE 205 is still in RM-Registered state. Note that the UE 205 would be in a kind of limited service state due to failed PDU Session (or slice-based) authentication/authorization, but successful network access authentication.

At Step 4*f*, the AMF 210 stores in the UE's context a corresponding information that the PDU Session identified by the combination [DNN, S-NSSAI] has been rejected and is disallowed to be established with associated reject criteria (see block 447). One possible reject criterion is "rejection until further indication from the DN" 415 (e.g., DN-AAA). Another possible criterion is an unavailability timer. If unavailability time has been sent to the UE 205 in step 4*d*, then the AMF 210 also stores the unavailability time.

The unavailability time is stored in the AMF 210 in order to reject potential PDU Session establishment requests sent from the UE 205 during the period when the unavailability time has not expired. Note that the "rejected PDU Session state" is not identified by a PDU Session ID (as generated by the UE 205), but by the combination of at least parameters [DNN, S-NSSAI]. Further parameters for PDU Session identification may be the PDU-type, e.g. Ethernet, IPv4, IPv6, etc.

For example, the AMF 210 may reject further N1 SM messages from the UE 205 towards the combination of parameters [DNN, S-NSSAI] by sending a NAS Transport Error message for the NAS UL Transport message carrying the UE's SM message. The NAS Transport Error message may additional include the unavailability time and the associated combination of parameters [DNN, S-NSSAI].

At optional Step 5, Application layer signaling between the UE and the Application Server (AS) or Application Function (e.g. AF) in the DN 415 may occur (see block 449). This is similar to step 7 in FIG. 3A.

At Step 6, an Application Function (AF) in the DN 415 may send at any time a Service update request message in order to enable the previously revoked service (e.g. revoked authorization or failed authentication, see messaging 451). Such messaging is similar to steps 8*a*, 8*b*, 8*c* from FIG. 3B. The AMF 210 may acknowledge the reception of the Service update request message and indicate to the DN 415 (e.g. AF or AAA-S) the success or failure of the processing of the Service update request message.

In certain embodiments, Step 6 may be performed via a NEF under the assumption that the AF knows the UE's GPSI and the AF is authorized to use the North Bound Interface ("NBI") APIs exposed by the NEF. Either the NEF or the AMF 210 may translate the request from the AF into the identification of a PDU Session, i.e. to the combination of parameters [DNN, S-NSSAI]. In one example, the AF ID may be translated into the combination of parameters [DNN, S-NSSAI]. In another example, the Service update request may include a parameter Service ID and the AMF 210 or NEF is able to map the Service ID to the combination of parameters [DNN, S-NSSAI].

Alternatively, the AF may use N5 interface and request a service enablement for a UE 205, for which the PDU Session authentication/authorization has previously failed or was revoked. In this case, the SMF 405 needs to know to which AMF 210 the UE 205 is currently registered, so that the SMF 405 (or a PCF) may request the AMF 210 to enable the establishment of PDU session towards the combination of parameters [DNN, S-NSSAI].

At Step 7, the AMF 210 initiates a NAS-level procedure (e.g. NAS MM procedure) to allow the establishment of PDU Session, which was previously rejected (e.g. the PDU Session identified by the combination of parameters [DNN, S-NSSAI], see messaging 453). For example, the AMF 210 may delete the entry in the UE's context that disallows the establishment of PDU towards the PDU Session with the combination of parameters [DNN, S-NSSAI]. If the AMF 210 has stored an unavailability time as per step 4f, then the AMF 210 deletes the unavailability time.

For example, the AMF 210 may initiate NAS UE Configuration Update procedure by sending UE Configuration Update Command indicating to the UE 205 to remove the entry of previously rejected PDU Session identified by parameters [DNN, S-NSSAI]. Alternatively, the AMF 210 may use another NAS MINI procedure (e.g. NAS Transport procedure or Registration procedure) to inform the UE 205.

At Step 8, the UE 205 may attempt UE-requested PDU Session Establishment, e.g. as in Step 1 (see block 455). Here, the UE 205 may again request access to the previously unavailable S-NSSAI.

Figure 5:
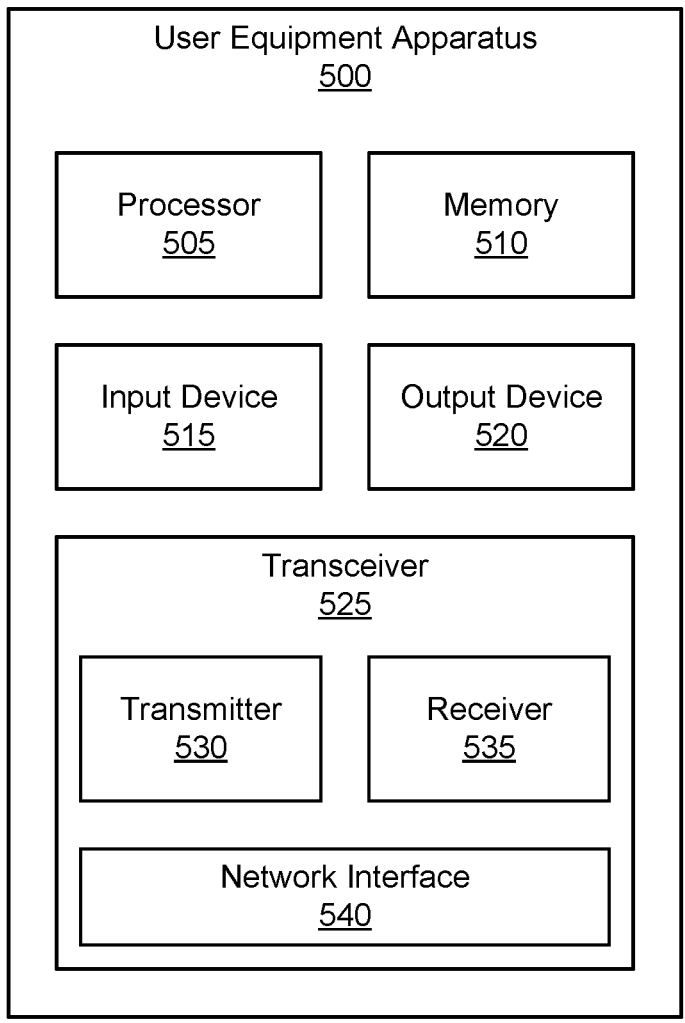
FIG. 5 is a schematic block diagram illustrating one embodiment of a user equipment apparatus that may be used for accessing a denied network resource.

FIG. 5 depicts a user equipment apparatus 500 that may be used for accessing a denied network resource, according to embodiments of the disclosure. In various embodiments, the user equipment apparatus 500 is used to implement the First Solution and/or Second Solution, described above. The user equipment apparatus 500 may be one embodiment of the remote unit 105 or UE, described above. Furthermore, the user equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the user equipment apparatus 500 receives (e.g., via the transceiver 525) transceiver that receives a first message indicating that access to a network resource in a mobile communication network is denied (e.g., temporarily) due to authorization specific for the network resource. Here, the network resource may be identified by at least one of: a network slice identifier (e.g., S-NSSAI) and a DNN. The processor 505 monitors for a condition to be met prior to initiating a new request for establishing an access to the denied network resource and initiates signaling towards the network to establish an access to the denied network resource in response to the condition being met.

In some embodiments, the first message includes a cause value indicating a reason for the denial of access to the network resource, wherein the cause value indicates that access to a network resource in a mobile communication network is denied due to one of: failed authentication of the UE, revoked authorization, and incomplete (e.g., pending) authentication.

In some embodiments, the first message further indicates the condition to be met before initiating signaling to establish access to the network resource for which access is denied. In some embodiments, the first message further includes an empty set of allowed network resources to be accessed. For example, in the case of pending authentication, the UE may receive an empty list of slice identifiers, e.g. S-NSSAI, where the denied network resources are identified by slice identifier.

In some embodiments, the first message indicates that registration to the network is rejected. In such embodiments, access to all requested network resources is denied. One example of such a first message is a deregistration request message. For example, the first message may be an explicit De-Registration Request that includes a list of Rejected S-NSSAIs, each of them with the appropriate rejection cause value. In certain embodiments, the condition to be met may include receipt of a second message from the network (e.g., from the AMF 133 or AMF 210) which revokes the indication of the denied network resource or expiration of a network resource unavailability timer, wherein the first message contains a value for the network resource unavailability timer.

In some embodiments, the processor 505 maintains a list of denied network resource identities (e.g., S-NSSAIs or the parameters [DNN, S-NSSAI]). In such embodiments, an entry from the list of denied network resource identities may be deleted upon occurrence of one or more events selected from the set comprising: a UE transition to a deregistered state, UICC removal at the UE, URSP policy update, trigger from upper layers, and expiration of a network resource unavailability timer.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to accessing a denied network resource. For example, the memory 510 may store a list of rejected/denied network resources, an unavailability time, or the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. Additionally, the transceiver 525 may support at least one network interface 540. Here, the at least one network interface 540 facilitates communication with a RAN node, such as an eNB or gNB, for example using the "Uu" interface. Additionally, the at least one network interface 540 may include an interface used for communications with one or more network functions in the mobile core network, such as a UPF, an AMF, and/or a SMF.

In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an application-specific integrated circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
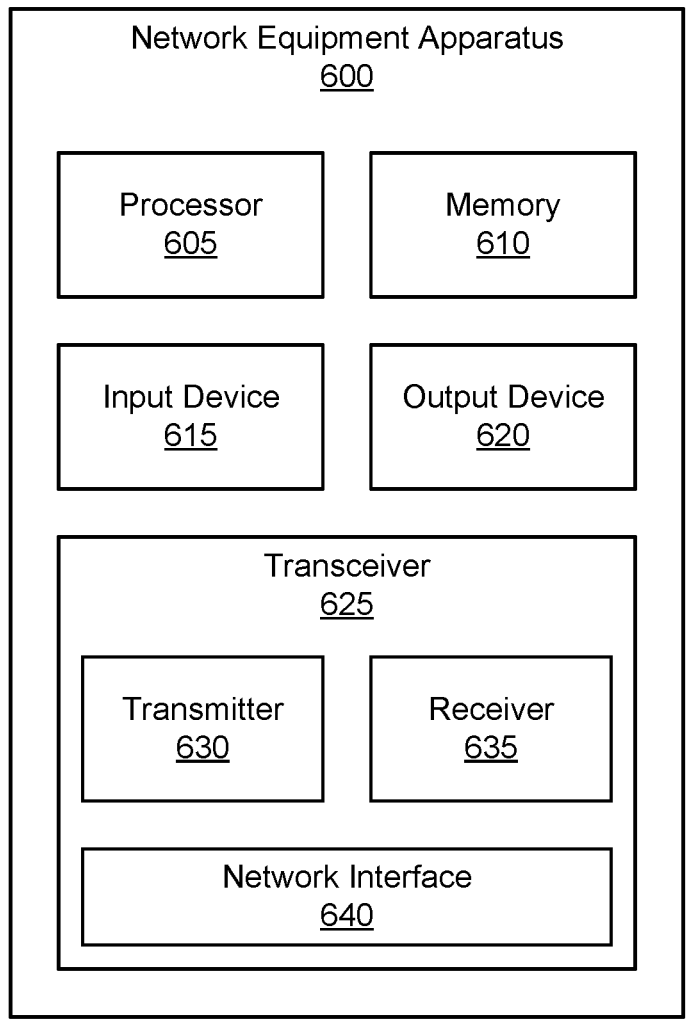
FIG. 6 is a schematic block diagram illustrating one embodiment of a user equipment apparatus that may be used for accessing a denied network resource.

FIG. 6 depicts a network equipment apparatus 600 that may be used for accessing a denied network resource, according to embodiments of the disclosure. In various embodiments, the network equipment apparatus 600 is used to implement the First Solution and/or Second Solution, described above. The network equipment apparatus 600 may be one embodiment of the remote unit 105 or UE, described above. Furthermore, the network equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the network equipment apparatus 600 may not include any input device 615 and/or output device 620. In various embodiments, the network equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network equipment apparatus 600 receives (e.g., via the transceiver 625) receives at the network function (e.g. from AAA server) a first message indicating unavailability of a service resource in a mobile communication network (e.g., UE access is denied due to authentication or authorization specific to a network resource). The processor 605 determines conditions to allow to the UE to request a network resource again, the network resource corresponding to the service resource, and sends a second message to a UE indicating that access to the network resource is denied in response the first message and indicating conditions to allow to the UE to request the network resource again. The processor 605 also maintains a list of rejected service resources (e.g., DNN and/or S-NS-SAI).

In some embodiments, the service resource is a S-NSSAI or DNN, wherein the conditions to allow the UE to request the service resources comprises at least one of: receipt of a second message from the network which revokes the indication of the denied network resource and expiration of a network resource unavailability timer, wherein the first message contains a value for the network resource unavailability timer.

In some embodiments, the transceiver 625 receives a third message indicating that access to the service resource is available and sends a fourth message to the UE to enable the access to the service resource associated with the service. In such embodiments, the network function removes the service resource from the maintenance list in response to the third message.

In some embodiments, the first message indicates the unavailability of the service resource due to one of: failed NSSAA of the UE, revoked authorization of the UE, and incomplete (e.g., pending) NSSAA of the UE. In some embodiments, the first message includes a request to disallow further access requests from the UE. In such embodiments, the first message may be received from at least one of: a session management function (e.g., for the case of PDU Session rejection due to failed Secondary authentication) and an authentication server function (e.g., an AAA proxy).

In some embodiments, the processor 605 maintains a service unavailability timer for the unavailable service resource (e.g. in order to reject further requests to that service from the UE). In such embodiments, the second message may indicate an unavailability timer value to the UE, wherein the UE is not to again request access to the network resource before expiration of the unavailability timer.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to accessing a denied network resource. For example, the memory 610 may store a list of rejected service resources, a list of denied network resources, an unavailability time, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with other network functions in the PLMN, as described herein. Although only one transmitter 630 and one receiver 635 are illustrated, the network equipment apparatus 600 may have any suitable number of transmitters 630 and receivers 635. Further, the transmitter(s) 625 and the receiver(s) 630 may be any suitable type of transmitters and receivers.

FIG. 7 depicts one embodiment of a method 700 for accessing a denied network resource, according to embodiments of the disclosure. In various embodiments, the method 700 is performed by the remote unit 105, the UE 205, and/or the user equipment apparatus 500, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and receives 705 a first message indicating that access to a network resource in a mobile communication network is denied (e.g., temporarily) due to authorization specific for the network resource. Here, the network resource is identified by at least one of: a network slice identifier (e.g., S-NSSAI) and a DNN. The method 700 includes monitoring 710 for a condition to be met prior to initiating a new request for establishing an access to the denied network resource. The method 700 includes initiating 715 signaling towards the network to establish an access to the denied network resource in response to the condition being met. The method 700 ends.

FIG. 8 depicts one embodiment of a method 800 for accessing a denied network resource, according to embodiments of the disclosure. In various embodiments, the method 800 is performed by a network function, such as the AMF

133, the AMF 210, and/or the network equipment apparatus 600, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins and receives 805 (e.g. from AAA server) a first message indicating unavailability of a service resource in a mobile communication network (e.g., UE access is denied due to authentication or authorization specific to a network resource). The method 800 includes determining 810 conditions to allow to the UE to request a network resource again, the network resource corresponding to the service resource, and sending 815 a second message to a UE indicating that access to the network resource is denied in response the first message and indicating conditions to allow to the UE to request the network resource again. The second method includes maintaining 820 a list of rejected service resources (e.g., DNN and/or S-NSSAI). The method 800 ends.

Disclosed herein is a first apparatus for accessing a denied network resource, according to embodiments of the disclosure. The first apparatus may be implemented by a UE, such as the remote unit 105, the UE 205, and/or the user equipment apparatus 500. The first apparatus includes a processor and a transceiver that receives a first message indicating that access to a network resource in a mobile communication network is denied (e.g., temporarily) due to authorization specific for the network resource. Here, the network resource is identified by at least one of: a network slice identifier (e.g., S-NSSAI) and a data network name ("DNN"). The processor monitors for a condition to be met prior to initiating a new request for establishing an access to the denied network resource and initiates signaling towards the network to establish an access to the denied network resource in response to the condition being met.

In some embodiments, the first message includes a cause value indicating a reason for the denial of access to the network resource, wherein the cause value indicates that access to a network resource in a mobile communication network is denied due to one of: failed authentication of the UE, revoked authorization, and incomplete (e.g., pending) authentication.

In some embodiments, the first message further indicates the condition to be met before initiating signaling to establish access to the network resource for which access is denied. In some embodiments, the first message further includes an empty set of allowed network resources to be accessed. For example, in the case of pending authentication, the UE may receive an empty list of slice identifiers, e.g. S-NSSAI, where the denied network resources are identified by slice identifier.

In some embodiments, the first message indicates that registration to the network is rejected. In such embodiments, access to all requested network resources is denied. One example of such a first message is a deregistration request message. In certain embodiments, the condition to be met may include receipt of a second message from the network which revokes the indication of the denied network resource or expiration of a network resource unavailability timer, wherein the first message contains a value for the network resource unavailability timer.

In some embodiments, the processor maintains a list of denied network resource identities (e.g., S-NSSAIs or the parameters [DNN, S-NSSAI]). In such embodiments, an entry from the list of denied network resource identities may be deleted upon occurrence of an event selected from the set comprising: a UE transition to a deregistered state, UICC removal at the UE, URSP policy update, trigger from upper layers, and expiration of a network resource unavailability timer.

Disclosed herein is a first method for accessing a denied network resource, according to embodiments of the disclosure. The first method may be performed by a UE, such as the remote unit 105, the UE 205, and/or the user equipment apparatus 500. The first method includes receiving at a UE a first message indicating that access to a network resource in a mobile communication network is denied (e.g., temporarily) due to authorization specific for the network resource. Here, the network resource is identified by at least one of: a network slice identifier (e.g., S-NSSAI) and a data network name ("DNN"). The first method includes monitoring for a condition to be met prior to initiating a new request for establishing an access to the denied network resource and initiating signaling towards the network to establish an access to the denied network resource in response to the condition being met.

In some embodiments, the first message includes a cause value indicating a reason for the denial of access to the network resource, wherein the cause value indicates that access to a network resource in a mobile communication network is denied due to one of: failed authentication of the UE, revoked authorization, and incomplete (e.g., pending) authentication.

In some embodiments, the first message further indicates the condition to be met before initiating signaling to establish access to the network resource for which access is denied. In some embodiments, the first message further includes an empty set of allowed network resources to be accessed. For example, in the case of pending authentication, the UE may receive an empty list of slice identifiers, e.g. S-NSSAI, where the denied network resources are identified by slice identifier.

In some embodiments, the first message indicates that registration to the network is rejected. In such embodiments, access to all requested network resources is denied. One example of such a first message is a deregistration request message. In certain embodiments, the condition to be met may include receipt of a second message from the network which revokes the indication of the denied network resource or expiration of a network resource unavailability timer, wherein the first message contains a value for the network resource unavailability timer.

In some embodiments, the UE maintains a list of denied network resource identities (e.g., S-NSSAIs or the parameters [DNN, S-NSSAI]). In such embodiments, an entry from the list of denied network resource identities may be deleted upon occurrence of an event selected from the set comprising: a UE transition to a deregistered state, UICC removal at the UE, URSP policy update, trigger from upper layers, and expiration of a network resource unavailability timer.

Disclosed herein is a second apparatus for accessing a denied network resource, according to embodiments of the disclosure. The second apparatus may be implemented by a network function, such as the AMF 133, the AMF 210, and/or the network equipment apparatus 600. The second apparatus includes a processor and a transceiver that receives at the network function (e.g. from AAA server) a first message indicating unavailability of a service resource in a mobile communication network (e.g., UE access is denied due to authentication or authorization specific to a network resource). The processor determines conditions to allow to the UE to request a network resource again, the network resource corresponding to the service resource, and sends a second message to a UE indicating that access to the network resource is denied in response the first message and indicating conditions to allow to the UE to request the network resource again. The processor also maintains a list of rejected service resources (e.g., DNN and/or S-NSSAI).

In some embodiments, the service resource is a S-NSSAI or data network name ("DNN"), wherein the conditions to allow the UE to request the service resources comprises at least one of: receipt of a second message from the network which revokes the indication of the denied network resource and expiration of a network resource unavailability timer, wherein the first message contains a value for the network resource unavailability timer.

In some embodiments, the transceiver receives a third message indicating that access to the service resource is available and sends a fourth message to the UE to enable the access to the service resource associated with the service. In such embodiments, the network function removes the service resource from the maintenance list in response to the third message.

In some embodiments, the first message indicates the unavailability of the service resource due to one of: failed Network Slice Specific Authentication and Authorization ("NSSAA") of the UE, revoked authorization of the UE, and incomplete (e.g., pending) NSSAA of the UE. In some embodiments, the first message includes a request to disallow further access requests from the UE. In such embodiments, the first message may be received from at least one of: a session management function (e.g., for the case of PDU Session rejection due to failed Secondary authentication) and an authentication server function (e.g., an AAA proxy).

In some embodiments, the processor maintains a service unavailability timer for the unavailable service resource (e.g. in order to reject further requests to that service from the UE). In such embodiments, the second message may indicate an unavailability timer value to the UE, wherein the UE is not to again request access to the network resource before expiration of the unavailability timer.

Disclosed herein is a second method for accessing a denied network resource, according to embodiments of the disclosure. The second method may be performed by a network function, such as the remote unit 105, the AMF 133, the AMF 210, and/or the network equipment apparatus 600. The second method includes receiving at the network function (e.g. from AAA server) a first message indicating unavailability of a service resource in a mobile communication network (e.g., UE access is denied due to authentication or authorization specific to a network resource). The second method includes determining conditions to allow to the UE to request a network resource again, the network resource corresponding to the service resource, and sending a second message to a UE indicating that access to the network resource is denied in response the first message and indicating conditions to allow to the UE to request the network resource again. The second method includes maintaining a list of rejected service resources (e.g., DNN and/or S-NSSAI).

In some embodiments, the service resource is a S-NSSAI or data network name ("DNN"), wherein the conditions to allow the UE to request the service resources comprises at least one of: receipt of a second message from the network which revokes the indication of the denied network resource and expiration of a network resource unavailability timer, wherein the first message contains a value for the network resource unavailability timer.

In some embodiments, the method includes receiving at the network function a third message indicating that access to the service resource is available and sending a fourth message to the UE to enable the access to the service resource associated with the service. In such embodiments, the network function removes the service resource from the maintenance list in response to the third message.

In some embodiments, the first message indicates the unavailability of the service resource due to one of: failed Network Slice Specific Authentication and Authorization ("NSSAA") of the UE, revoked authorization of the UE, and incomplete (e.g., pending) NSSAA of the UE. In some embodiments, the first message includes a request to disallow further access requests from the UE. In such embodiments, the first message may be received from at least one of: a session management function (e.g., for the case of PDU Session rejection due to failed Secondary authentication) and an authentication server function (e.g., an AAA proxy).

In some embodiments, the second method includes maintaining a service unavailability timer for the unavailable service resource (e.g. in order to reject further requests to that service from the UE). In such embodiments, the second message may indicate an unavailability timer value to the UE, wherein the UE is not to again request access to the network resource before expiration of the unavailability timer.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:

transmitting a first registration request to register with a mobile communication network, the first registration request comprising a set of one or more network slices;

receiving a registration response comprising an empty allowed network slice selection assistance information ("NSSAI") parameter;

determining, based on the empty allowed NSSAI parameter, to avoid other network services except emergency services;

receiving an authentication message associated with a network slice specific authentication and authorization procedure;

transmitting an authentication response in response to the authentication message;

receiving a first reply message from a network function in the mobile communication network indicating that the UE's access to a network slice in the mobile communication network is denied due to an authentication failure or an authorization specific failure, wherein the authentication failure or authorization specific failure is one of:

failed Network-Slice-Specific Authentication and Authorization ("NSSAA") of the UE, or revoked authorization of the UE;

monitoring for an authorization specific condition corresponding to the authentication failure or the authorization specific failure to be met prior to the UE initiating a second registration request to register with the network slice that is denied due to the authentication failure or the authorization specific failure; and initiating signaling towards the mobile communication network to register with the network slice that is denied due to the authentication failure or the authorization specific failure in response to the authorization specific condition corresponding to the authentication failure or the authorization specific failure being met.

2. The method of claim 1, wherein the first reply message includes a cause value indicating a reason for a denial of the UE to access to the network slice, wherein the cause value indicates that the UE's access to the network slice in the mobile communication network is denied due to one of: failed NSSAA of the UE, revoked authorization for the UE, or incomplete authentication of the UE.

3. The method of claim 1, wherein the first reply message further indicates the authorization specific condition to be met before the UE initiates signaling to request that the UE be provided access to the network slice for which access is denied to the UE.

4. The method of claim 1, wherein the empty allowed NSSAI parameter comprises an empty list of network slice identifiers.

5. The method of claim 1, wherein the first reply message indicates that the UE's registration to the network slice is rejected due to the authentication failure or the authorization specific failure, and wherein the UE's access to all requested network resources is denied.

6. The method of claim 1,
wherein the authorization specific condition to be met comprises one of:
the UE receiving a second reply message from the network that revokes the indication of the network slice that is denied to the UE due to the authentication failure or the authorization specific failure, or
an expiration of a network slice unavailability timer, and
wherein the first reply message includes a value for the network slice unavailability timer.

7. The method of claim 1, further comprising maintaining a list of denied network slice identities, and deleting an entry from the list of denied network slice identities upon occurrence of an event selected from the set comprising: a UE transition to a deregistered state, universal integrated circuit card ("UICC") removal at the UE, UE route selection policy ("URSP") policy update, trigger from upper layers, expiration of a network slice unavailability timer, or a combination thereof.

8. A User Equipment ("UE") apparatus comprising:
at least one memory; and
at least one processor coupled with the at least one memory and configured to cause the UE to:
transmit, to a network function in a mobile communication network, a first registration request to register with the mobile communication network, the first registration request comprising a set of one or more network slices;
receive a registration response comprising an empty allowed network slice selection assistance information ("NSSAI") parameter;
determine based on the empty allowed NSSAI parameter, to avoid other network services except emergency services;
receive an authentication message associated with a network slice specific authentication and authorization procedure;
transmit an authentication response in response to the authentication message;

receive, from the network function, a first reply message indicating that the UE apparatus's access to a network slice in the mobile communication network is denied due to an authentication failure or an authorization specific failure, wherein the authentication failure or authorization specific failure is one of:
failed Network-Slice-Specific Authentication and Authorization ("NSSAA") of the UE apparatus, or revoked authorization of the UE apparatus;
monitor for an authorization specific condition corresponding to the authentication failure or the authorization specific failure to be met prior to initiating a second registration request to register with the network slice that is denied due to the authentication failure or the authorization specific failure; and
initiate signaling towards the mobile communication network to register with the network slice that is denied due to the authentication failure or the authorization specific failure in response to the authorization specific condition corresponding to the authentication failure or the authorization specific failure being met.

9. The apparatus of claim 8, wherein the first reply message includes a cause value indicating a reason for a denial of the UE apparatus's access to the network slice, and wherein the cause value further indicates that the UE apparatus's access to the network slice in the mobile communication network is denied due to one of: failed NSSAA of the UE apparatus, revoked authorization for the UE apparatus, or incomplete authentication of the UE apparatus.

10. The apparatus of claim 8, wherein the first reply message indicates the authorization specific condition to be met before initiating signaling to request access to the network slice that is denied due to the authentication failure or the authorization specific failure for which access is denied.

11. A method comprising:
receiving, from a user equipment ("UE"), a first registration request to register with a mobile communication network, the first registration request comprising a set of one or more network slices;
transmitting a registration response comprising an empty allowed network slice selection assistance information ("NSSAI") parameter;
transmitting an authentication message associated with a network slice specific authentication and authorization procedure;
receiving, from the UE, an authentication response in response to the authentication message;
receiving, at a network function, a first reply message from a network resource in the mobile communication network indicating unavailability of a network slice to the UE due to an authentication failure or an authorization specific failure for the UE, wherein the authentication failure or authorization specific failure is one of:
failed Network-Slice-Specific Authentication and Authorization ("NSSAA") of the UE, or revoked authorization of the UE;
determining one or more authorization specific conditions corresponding to the authentication failure or the authorization specific failure to allow the UE to register with the network slice again in response to the one or more authorization specific conditions corresponding to the authentication failure or the authorization specific failure being satisfied;
sending a second reply message to the UE indicating that access to the network slice is denied in response to the authentication failure or the authorization specific failure indicated in the first reply message and further indicating the one or more authorization specific conditions corresponding to the authentication failure or the authorization specific failure to allow the UE to register with the network slice again; and maintaining a list of rejected network slices.

12. The method of claim 11, wherein the one or more authorization specific conditions to allow the UE to request the network slice comprises at least one of:

receipt of a message which revokes the indication of the network slice that is denied due to the authentication failure or the authorization specific failure, expiration of a network slice unavailability timer, or a combination thereof.

13. The method of claim 11, further comprising:

receiving, at the network function, an indication that access to the network slice is available, removing the network slice from the list of rejected network slices in response to the indication; and transmitting message to the UE to enable the UE to access to the network slice.

14. The method of claim 11, wherein the first reply message includes a cause value that indicates that the unavailability of the network slice due to one of: failed Network Slice Specific Authentication and Authorization ("NSSAA") of the UE, revoked authorization of the UE, or incomplete NSSAA of the UE.

15. The method of claim 11, wherein the first reply message includes a request to disallow further access requests from the UE, and wherein the first reply message is received at least from one of: a session management function or an authentication server function.

16. The method of claim 11, further comprising maintaining a service unavailability timer for the network slice.

17. The method of claim 16, wherein the second reply message indicates an unavailability timer value to the UE.

18. An apparatus comprising:

a transceiver that communicates with a mobile communication network; and at least one memory; and at least one processor coupled with the at least one memory and configured to cause the UE to:

receive, from a user equipment ("UE"), a first registration request to register with a mobile communication network, the first registration request comprising a set of one or more network slices;

transmit a registration response comprising an empty allowed network slice selection assistance information ("NSSAI") parameter;

transmit, an authentication message associated with a network slice specific authentication and authorization procedure;

receive, from the UE, an authentication response in response to the authentication message;

receive, at a network function, a first reply message from a network resource in the mobile communication network indicating unavailability of a network slice to the UE due to an authentication failure or an authorization specific failure for the UE, wherein the authentication failure or authorization specific failure is one of:

failed Network-Slice-Specific Authentication and Authorization ("NSSAA") of the UE, or revoked authorization of the UE;

determine one or more authorization specific conditions corresponding to the authentication failure or the authorization specific failure to allow the UE to register with the network slice again in response to the one or more authorization specific conditions corresponding to the authentication failure or the authorization specific failure being satisfied;

transmit a second reply message to the UE indicating that access to the network slice is denied in response to the authentication failure or the authorization specific failure indicated in the first reply message and further indicating the one or more authorization specific conditions corresponding to the authentication failure or the authorization specific failure to allow the UE to register with the network slice again; and maintain a list of rejected network slices.

19. The apparatus of claim 18, wherein the first reply message includes a cause value that indicates that the unavailability of the network slice due to one of: failed Network Slice Specific Authentication and Authorization ("NSSAA") of the UE, revoked authorization of the UE, or incomplete NSSAA of the UE.

20. The apparatus of claim 18, wherein the first reply message includes a request to disallow further requests, and wherein the first reply message is received at least from one of: a session management function or an authentication server function.

* * * * *